(12) United States Patent
Tanaka et al.

(10) Patent No.: US 12,197,325 B2
(45) Date of Patent: Jan. 14, 2025

(54) STORAGE APPARATUS AND METHOD OF CONTROLLING STORAGE CONTROLLER

(71) Applicant: Hitachi, Ltd., Tokyo (JP)

(72) Inventors: Katsuya Tanaka, Tokyo (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/368,502

(22) Filed: Sep. 14, 2023

(65) Prior Publication Data
US 2024/0385960 A1 Nov. 21, 2024

(51) Int. Cl.
G06F 12/02 (2006.01)
G06F 13/16 (2006.01)
G06F 13/18 (2006.01)
G06F 13/40 (2006.01)

(52) U.S. Cl.
CPC ...... *G06F 12/0292* (2013.01); *G06F 13/1642* (2013.01); *G06F 13/18* (2013.01); *G06F 13/4022* (2013.01)

(58) Field of Classification Search
CPC .. G06F 12/0292; G06F 13/1642; G06F 13/18; G06F 13/4022
See application file for complete search history.

(56) References Cited

U.S. PATENT DOCUMENTS

| | | | | |
|---|---|---|---|---|
| 8,423,677 B2* | 4/2013 | Nakamura | .......... | H04L 67/1001 709/224 |
| 8,700,856 B2* | 4/2014 | Tanaka | .......... | G06F 11/2017 711/123 |
| 10,795,608 B2* | 10/2020 | Akaike | .......... | G06F 3/0611 |
| 2015/0350322 A1* | 12/2015 | Akaike | .......... | G06F 3/0632 707/827 |

* cited by examiner

*Primary Examiner* — Gurtej Bansal
(74) *Attorney, Agent, or Firm* — PROCOPIO, CORY, HARGREAVES & SAVITCH LLP

(57) ABSTRACT

A frontend interface of a controller according to the present invention includes a plurality of corresponding queueing interfaces for each processor of the controller, and an enqueueing destination of a host I/O command can be switched in response to an instruction from a processor. When a controller OS restarts, the controller waits for completion of a host I/O and executes controller blocking and restarting during setup. Therefore, to determine whether or not this process is possible, the processor gives an instruction to switch a queue and waits until a switch source queue is empty.

13 Claims, 15 Drawing Sheets

STORAGE APPARATUS AND METHOD OF CONTROLLING STORAGE CONTROLLER

CLAIM OF PRIORITY

The present application claims priority from Japanese patent application JP 2023-081528 filed on May 17, 2023, the content of which is hereby incorporated by reference into this application.

BACKGROUND OF THE INVENTION

1. Field of the Invention

The present invention relates to a storage apparatus including a frontend interface and a processor.

2. Description of Related Art

In storage apparatuses, to improve reliability, a plurality of storage controllers that are in charge of controlling the storage apparatuses (hereinafter simply referred to as controllers) are provided. Even when a failure occurs and an operation stops in any controller, the remaining controllers can continue to operate. A typical number of such controllers is two.

For example, U.S. Pat. No. 8,700,856B discloses an example in which two controllers are included in a controller unit of a storage apparatus. In this case, a processor controlling a system is mounted on each controller and a switch connected to each processor can include a non-transparent bridge (NTB).

One of roles of the NTB is an address translation function between an address used by the processor connected to each switch and another address. In particular, when two controllers are connected, each processor controls and manages addresses used by each processor. Therefore, it is necessary to convert an address used by the processor of one controller into an address used by the processor of the other controller. For example, since each processor allocates a mutually independent address to a protocol chip, a memory, or the like to be connected, the same address cannot be used in direct connection. Two processors are connected with the NTB and convert a transfer destination address of a packet passing through the NTB, so that data can be transferred mutually.

When each processor stops, there is no processor executing control on an address used by each processor. Therefore, for example, it is not unclear which address is allocated to which memory, and thus use cannot be made.

In storage apparatuses, it is necessary to stop processors of controllers in some cases, for example, by updating operating systems (OSs) of the controllers other than failures. In storage apparatuses, input/output (I/O) communication is executed to input and output data to host apparatuses. A protocol used for the I/O communication with the host apparatuses is, for example, Fibre Channel.

In controllers, frontend interfaces including protocol chips controlling protocols used for such I/O communication are mounted along with processors. When the processors of the controllers stop in such a situation, there are no processor connected to the frontend interfaces, and thus I/O requests from the host apparatuses cannot be processed. From the viewpoint of the host apparatuses, the storage apparatuses look like to be system down temporarily. For recovery, it is necessary to reconnect the host apparatuses to the remaining controllers which are still operating.

To solve this problem, it is conceivable that controllers including processors which do not stop are reconnected through OS update or the like in response to I/O requests from host apparatuses automatically.

For example, in a configuration described in U.S. Pat. No. 8,700,856B, two processors controlling a system are mounted. Therefore, it is conceivable that when the processor of one controller stops, an I/O request from a host apparatus is transferred to the processor of the other controller.

U.S. Pat. No. 8,423,677B discloses an example of a storage apparatus including a local router that has a function capable of switching I/O communication automatically even when a processor of a controller stops by distributing an access destination from a frontend interface to each controller automatically.

In a technique disclosed in US8,700,856B, only one NTB is mounted on each controller and each frontend interface uses an address controlled by the processor of each controller, and thus an address controlled by the other processor is not used. Therefore, the address cannot be used when the processor of the controller stops. Therefore, there is no usable address and each frontend interface cannot transfer a request from the host apparatus to the other processor.

In the technique disclosed in US8,423,677B, complicated control is necessary for the local router. Therefore, a certain processor is mounted to control a program in some cases. In these cases, it is necessary to stop and restart the local router when an OS of the local router itself is updated. In this case, a function of switching I/O communication with the host apparatus automatically by the local router cannot be used and the I/O communication with the host apparatus is disconnected.

Accordingly, when the processor of the controller stops, it is desirable to continuously respond to an I/O request from the host apparatus without including a special control functional unit as in the local router.

SUMMARY OF THE INVENTION

According to an aspect of the present invention, a storage apparatus that processes a request from a host apparatus includes a plurality of storage controllers. A first storage controller in the plurality of storage controllers includes a first frontend interface that controls a protocol of communication with the host apparatus, and a first processor that controls the storage apparatus. A second storage controller in the plurality of storage controllers includes a second processor that controls the storage apparatus. The first storage controller further includes a first address translation unit that executes translation between a first address used by the first processor and a second address used by the first frontend interface, a second address translation unit that executes translation between a third address used by the second processor and the second address used by the first frontend interface, a first outbound queue that controls data transfer from the first frontend interface to the first processor through the first address translation unit, and a first inbound queue that controls data transfer from the first processor to the first frontend interface through the first address translation unit. The second storage controller further includes a second outbound queue that controls data transfer from the first frontend interface to the second processor through the second address translation unit, and a second inbound queue that controls data transfer from the second processor to the first frontend interface through the second address translation unit. The first frontend interface receives a first enqueueing destination switch instruction to designate the second outbound queue as an enqueueing destination of a request from the host apparatus and then switches an enqueueing destination to the second outbound queue from a request which comes from the host apparatus and to which an identifier of a series of operations related to a subsequently received new host request is given.

According to the aspect of the present invention, even when a processor of one-side controller of dual controllers stops the process, a processor of the other controller can take over an I/O request from a host apparatus and continuously respond to the I/O request. The other problems, configurations, and advantages other than the above description are apparent in description of the following examples.

DESCRIPTION OF EMBODIMENTS

Figure 1:
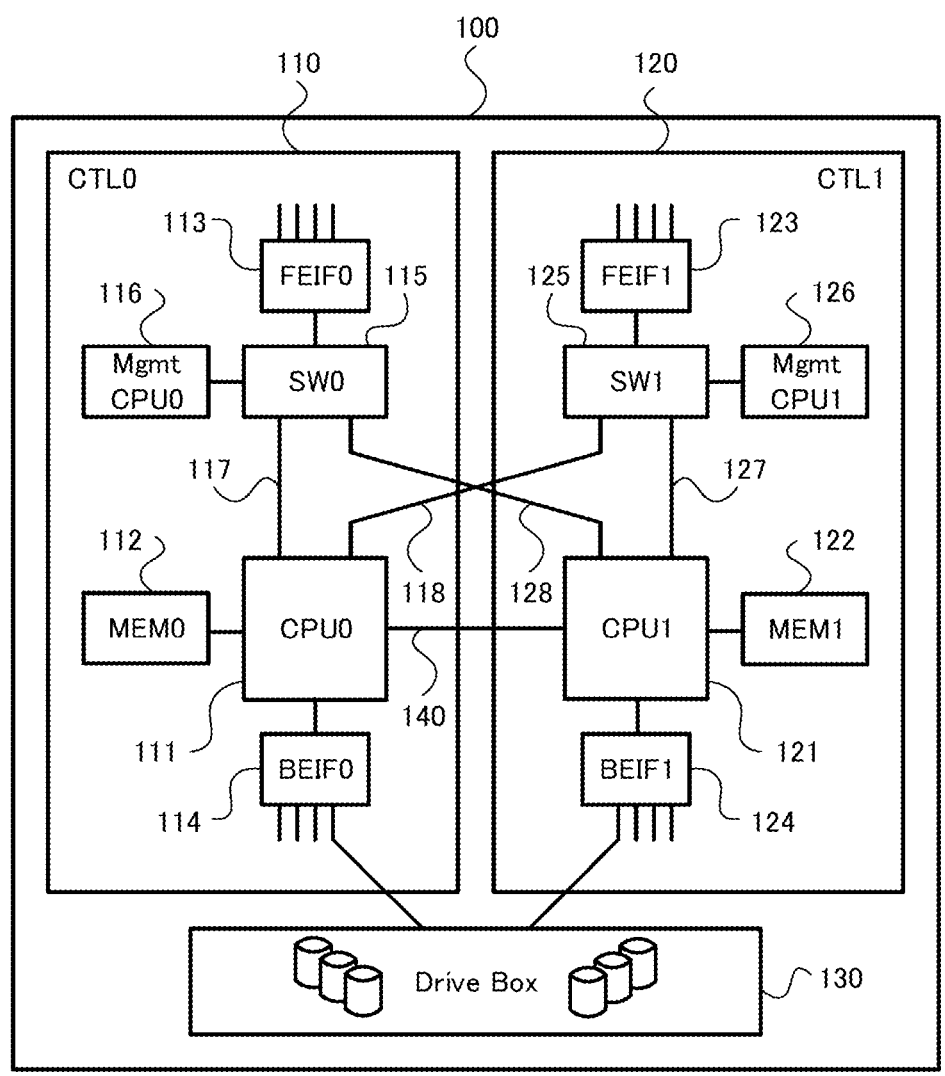
FIG. 1 is a diagram illustrating a storage apparatus according to Example 1.

Hereinafter, serval examples of the present invention will be described with reference to the drawings. In all the examples, it is assumed that constituents to which the same reference numerals are given are substantially the same constituents. Since processes executed by processors are executed while appropriately using storage resources (for example, memories) and communication interface devices (for example, communication ports), subjects of the processes may be considered to be processors. The processors may have dedicated hardware other than central processing units (CPUs).

Example 1

A storage apparatus according to Example 1 will be described with reference to FIGS. 1 to 9.

FIG. 1 is a diagram illustrating a storage apparatus according to Example 1.

A storage apparatus 100 includes controllers 110 and 120 and a drive box 130 that has a plurality of hard disk drives or a plurality of solid state drives.

The controller 110 includes a processor 111, a memory 112, a frontend interface 113, a backend interface 114, a PCI express (PCIe) switch 115, and a management processor 116. Similarly, the controller 120 includes a processor 121, a memory 122, a frontend interface 123, a backend interface 124, a PCIe switch 125, and a management processor 126. The processors 111 and 121 include a plurality of processor cores (not illustrated) therein.

A host apparatus (not illustrated) that accesses the storage apparatus 100 is connected to the storage apparatus 100 via the frontend interfaces 113 and 123. The host apparatus and the frontend interfaces 113 and 123 are connected with transfer lines such as Fibre Channel cables or Ethernet cables.

Alternatively, the host apparatus and the frontend interfaces 113 and 123 may be configured to be connected via a storage area network that includes a plurality of transfer lines and a plurality of switches. The frontend interfaces 113 and 123 convert a data transfer protocol between the host apparatus and the storage apparatus 100 and a data transfer protocol inside the controllers 110 and 120. The frontend interfaces 113 and 123 include protocol chips.

The drive box 130 is connected to the controllers 110 and 120 via the backend interfaces 114 and 124. The backend interfaces 114 and 124 convert the data transfer protocol inside the controllers 110 and 120 and a data transfer protocol between the controllers 110 and 120 and the drive box 130. When drives in the drive box are NVMeSSDs of PCIe connection, the backend interfaces 114 and 124 are PCIe switches that do not execute protocol conversion.

The processors 111 and 121 control data transfer between the host apparatus connected via the frontend interfaces 113 and 123 and the drive box 130 connected via the backend interfaces 114 and 124. Further, the processors 111 and 121 control data transfer between the controllers.

The memories 112 and 122 are main memories of the processors 111 and 121, respectively, and store programs (storage control programs or the like) which are executed by the processors 111 and 121, and management tables or the like which are referred to by the processors 111 and 121. The memories 112 and 122 are also used as cache memories of the controllers 110 and 120, respectively.

Figure 2:
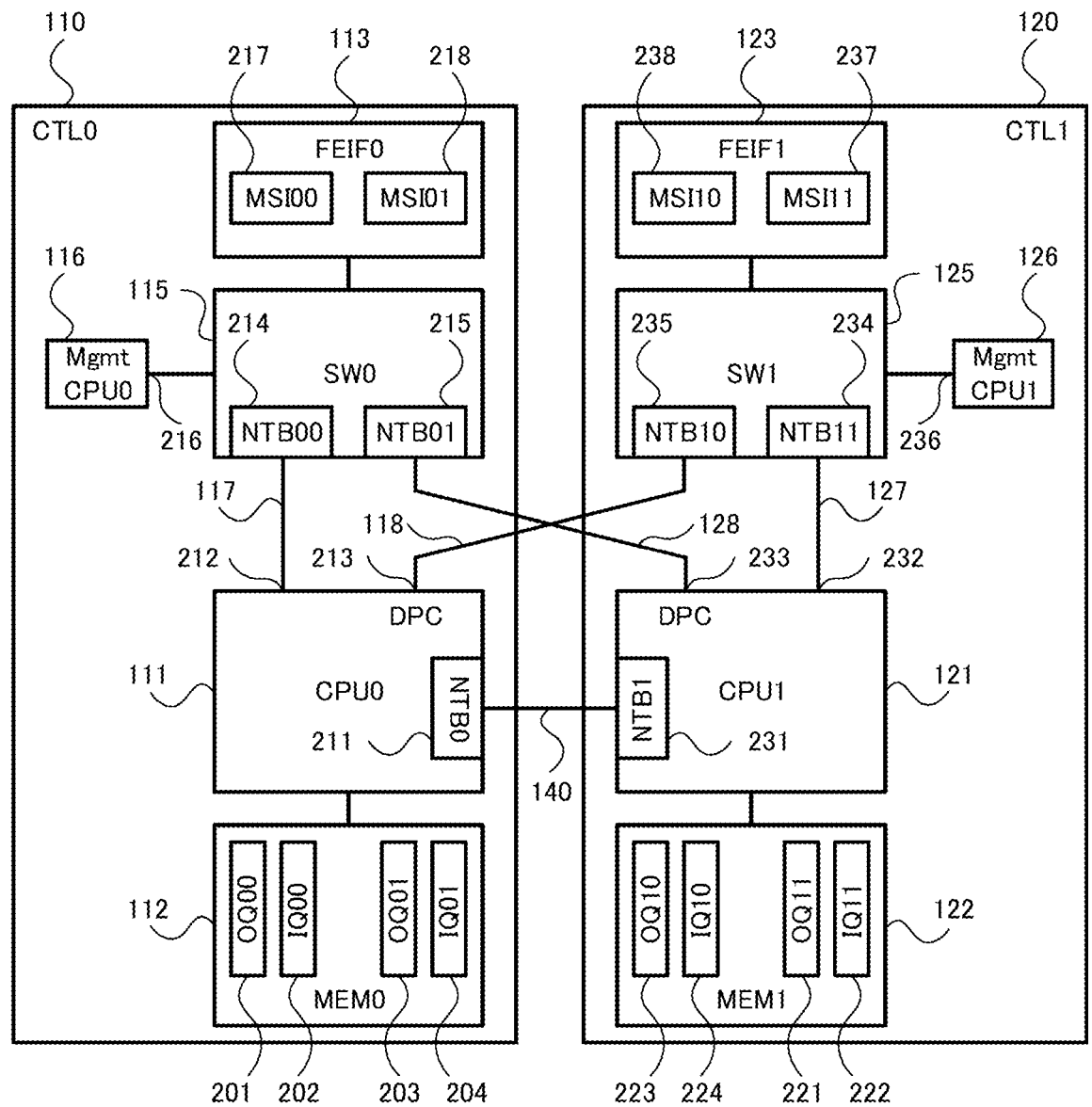
FIG. 2 is a diagram illustrating a configuration of controllers according to Example 1.

FIG. 2 is a diagram illustrating a configuration of the controllers 110 and 120 according to Example 1.

In FIG. 2, the backend interfaces 114 and 124 in FIG. 1 are not illustrated to facilitate description.

The processors 111 and 121 include NTBs 211 and 231, respectively. The NTBs 211 and 231 are connected with a link 140. The processors 111 and 121 can communicate with each other via the link 140. In this way, dual controllers are configured by two controllers 110 and 120 in the storage apparatus 100. The processors 111 and 121 transfer user data duplicated between the two controllers or control data of the controllers over the link 140.

The frontend interface 113 includes interrupt setting registers 217 and 218. The frontend interface 113 can send an interrupt such as a message signaled interrupt (MSI) to the address set in the interrupt setting registers 217 and 218. For example, in the interrupt setting register 217, an address to an interrupt controller (not illustrated) contained by the processor 111 is set. In the interrupt setting register 218, an address to an interrupt controller (not illustrated) contained by the processor 121 is set. In this way, the frontend interface 113 can send an interrupt to the processor 111 or 121. The interrupt is used in association with an error notification from the frontend interface to the processor or an operation of a control queue for data transfer to be described later.

Similarly, the frontend interface 123 includes interrupt setting registers 237 and 238. The frontend interface 123 can send an interrupt such as an MSI to the address set in the interrupt setting registers 237 and 238. For example, in the interrupt setting register 237, an address to an interrupt controller contained by the processor 121 is set. In the interrupt setting register 238, an address to an interrupt controller contained by the processor 111 is set. In this way, the frontend interface 123 can send an interrupt to the processor 111 or 121.

The interrupts sent to the processors 111 and 121 by the frontend interfaces 113 and 123 use only an MSI or an MSI-X which can pass through the NTB as a PCIe write request and do not use a legacy interrupt (INTx).

The PCIe switch 115 includes NTBs 214 and 215. The NTB 214 is connected to a port 212 of the processor 111 via a link 117. The NTB 215 is connected to a port 233 of the processor 121 via a link 128.

Similarly, the PCIe switch 125 includes NTBs 234 and 235. The NTB 234 is connected to a port 232 of the processor 121 via a link 127. The NTB 235 is connected to a port 213 of the processor 111 via a link 118.

The port 213 of the processor 111 and the port 233 of the processor 121 set a downstream port containment (DPC) function of the PCIe to be enabled. Accordingly, for example, when the controller 110 is detached from the storage apparatus 100, it is not necessary for the controller 120 remaining in the storage apparatus 100 to treat a link-down as an error even if the links 118 and 128 are turned down. Therefore, an operation can be continued.

Similarly, for example, when the controller 120 is detached from the storage apparatus 100, it is not necessary for the controller 110 remaining in the storage apparatus 100 to treat a link-down as an error even if the links 118 and 128 are turned down. Therefore, an operation can be continued.

The management processor 116 connects a Root Port 216 to the PCIe switch 115 and functions as a Root Complex for the frontend interface 113 and the PCIe switch 115.

Similarly, the management processor 126 connects a Root Port 236 to the PCIe switch 125 and functions as a Root Complex for the frontend interface 123 and the PCIe switch 125.

The management processor 116 is not involved in data transfer control between the host apparatus and the storage apparatus 100 and executes an initial setting or the like of the frontend interface 113 and the PCIe switch 115 including the NTBs 214 and 215. An alternative function of the management processor 116 may be contained in the PCIe switch 115.

Similarly, the management processor 126 is not involved in data transfer control between the host apparatus and the storage apparatus 100 and executes an initial setting or the like of the frontend interface 123 and the PCIe switch 125 including the NTBs 234 and 235. An alternative function of the management processor 126 may be contained in the PCIe switch 125.

The memories 112 and 122 have an outbound queue (OQ) and an inbound queue (IQ) for controlling data transfer between the processors 111 and 121 and the frontend interfaces 113 and 123. The OQ is a queue for controlling data transfer from the frontend interface to the processor and the IQ is a queue for controlling data transfer from the processor to the frontend interface.

The memory 112 includes an OQ 201 and an IQ 202 controlling data transfer between the processor 111 and the frontend interface 113. The memory 112 includes an OQ 203 and an controlling data transfer between the processor 111 and the frontend interface 123.

Similarly, the memory 122 includes an OQ 221 and an IQ 222 controlling data transfer between the processor 121 and the frontend interface 123. The memory 122 includes an OQ 223 and an IQ 224 controlling data transfer between the processor 121 and the frontend interface 113. In this way, in the storage apparatus according to Example 1, the control queues of the frontend interfaces are disposed over the two controllers.

In FIG. 2, the OQ 201 is displayed as "0000," the IQ 202 is displayed as "IQ00," the OQ 203 is displayed as "OQ01," the IQ 204 is displayed as "IQ01," the OQ 221 is displayed as "OQ11," the IQ 222 is displayed as "IQ11," the OQ 223 is displayed as "OQ10," and the IQ 224 is displayed as "IQ10."

The frontend interface 113 can switch whether to use the OQ 201 and the IQ 202 or use the OQ 223 and the IQ 224 in accordance with an instruction from the processor 111. Similarly, the frontend interface 123 can switch whether to use the OQ 221 and the IQ 222 or use the OQ 203 and the IQ 204 in accordance with an instruction from the processor 121.

The instruction from the processor is executed, for example, when the processor writes a predetermined value in the PCIe register of the frontend interface by a PCIe write request.

The foregoing switch setting situation is stored in the registers of the frontend interfaces 113 and 123 accessible with the PCIe, and thus can be read by the processors 111 and 121.

Each of the frontend interfaces 113 and 123 is connected to any of the processors 111 and 121 via the NTB. Accordingly, even when the processor 111 or 121 stops and the links 117 and 118 are linked down or the links 127 and 128 are linked down, links between the frontend interfaces 113 and 123 and the PCIe switches 115 and 125 are not linked down. That is, link states of the frontend interfaces 113 and 123 and the PCIe switches 115 and 125 are not affected due to stop of the processors 111 and 121.

Figure 3:
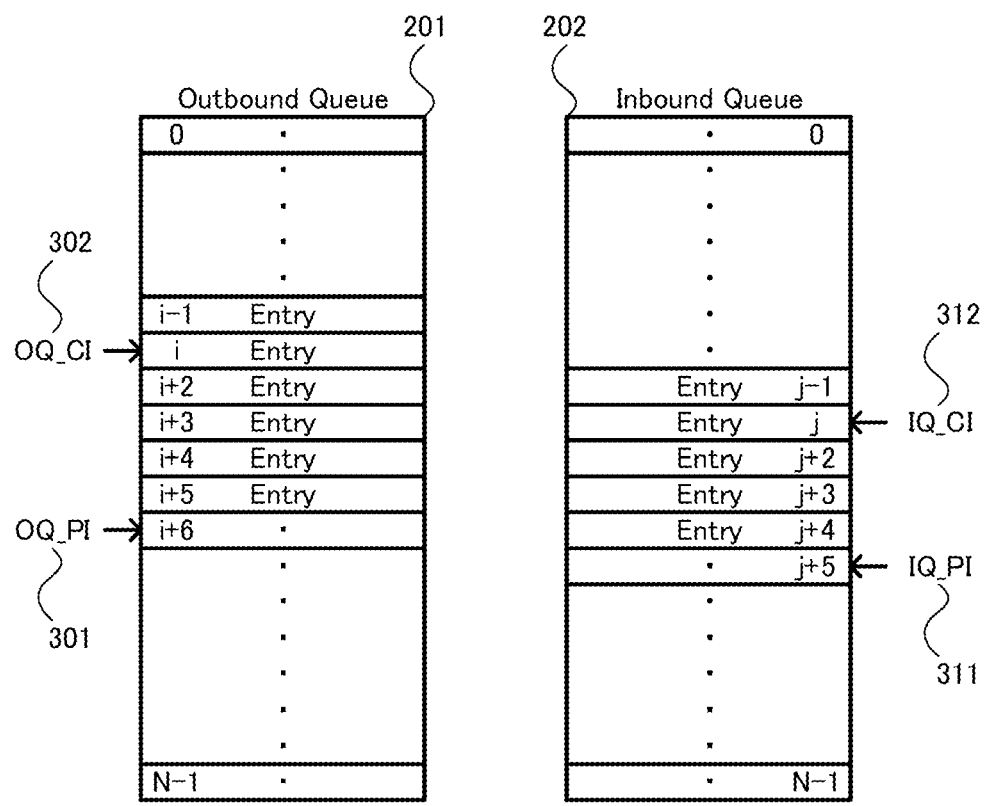
FIG. 3 is a diagram illustrating a configuration of an OQ and an IQ according to Example 1.

FIG. 3 is a diagram illustrating a configuration of an OQ and an IQ according to Example 1.

The OQ 201 and the IQ 202 store entries in a total of N elements from number 0 and number N−1. In the OQ 201, content of the entries are, for example, host I/O commands received from the host apparatus. In the IQ 202, content of the entries are, for example, responses corresponding to the completed host I/O commands or data transfer lists that the processor directs to the frontend interfaces. Each entry also includes identification information of an exchange (that is, an exchange ID) indicating to which exchange of the host I/O the entry is related. An exchange indicates a series of operations related to a read operation or a write operation between a host and a storage.

In the OQ 201 of FIG. 3, entries are stored in elements from i−1th to i+5th elements, for example. The other entries of the OQ 201 are empty. OQ_Producer Index (PI) 301 indicates a location of an element in which the frontend interface subsequently stores an entry. OQ Consumer Index (CI) 302 indicates a location of an element in which an entry subsequently read by the processor is stored. When OQ_PI 301 and OQ_CI 302 indicate the same element, an empty state where an unprocessed entry is not stored in the OQ 201 is indicated. In the i−1th element, a processed latest entry is stored. The processor can determine whether a process of an entry related to a certain exchange is completed by investigating an exchange ID of the entry.

In the IQ 202 of FIG. 3, entries are stored in elements from j−1th to i+4th elements, for example. The other entries of the IQ 202 are empty. IQ_PI 311 indicates a location of an element in which the processor subsequently stores an entry. IQ_CI 312 indicates a location of an element in which an entry subsequently read by the frontend interface is stored. When IQ_PI 311 and IQ_CI 312 indicate the same element, an empty state where an unprocessed entry is not stored in the IQ 202 is indicated. In the j−1th element, a processed latest entry is stored. The processor can determine whether a process of an entry related to a certain exchange is completed by investigating an exchange ID of the entry.

Figure 4:
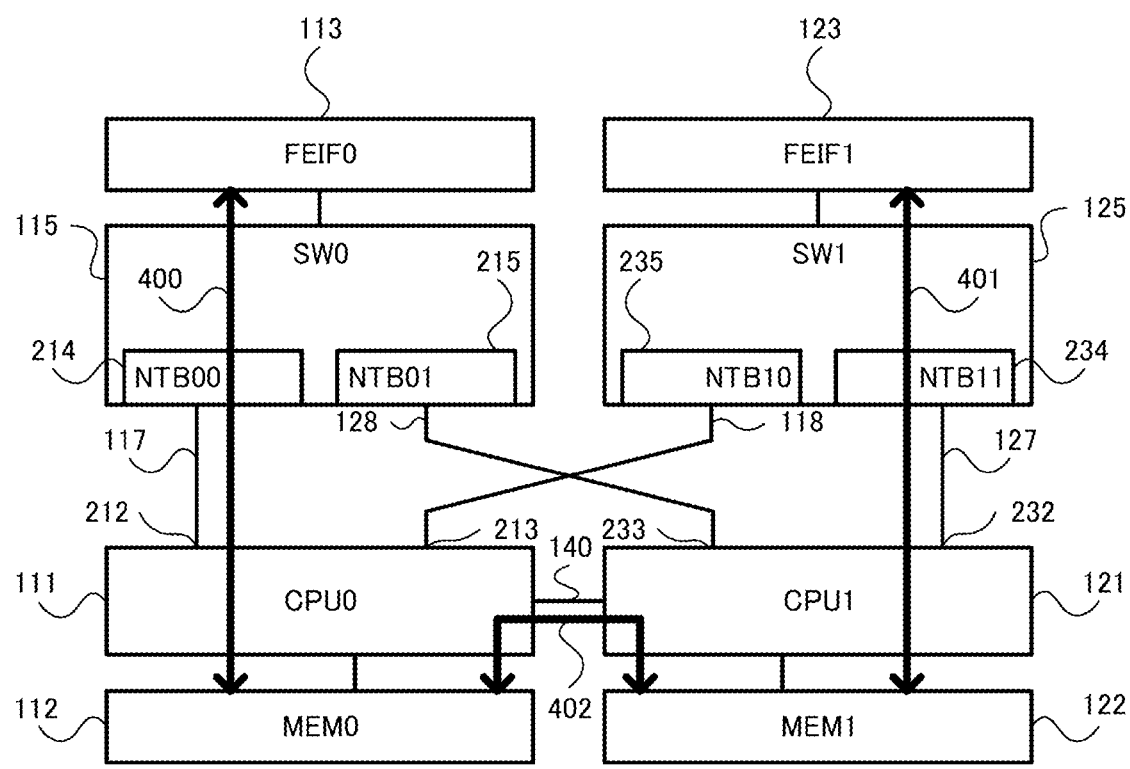
FIG. 4 is a diagram illustrating a data transfer path at a normal time between frontend interfaces and memories in the storage apparatus according to Example 1.

FIG. 4 is a diagram illustrating a data transfer path at a normal time between frontend interfaces and memories in the storage apparatus 100 according to Example 1.

Here, it is assumed that the frontend interface 113 and the processor 111 use the OQ 201 and the IQ 202 of FIG. 2 and the frontend interface 123 and the processor 121 uses the OQ 221 and the IQ 222 of FIG. 2.

The frontend interface 113 accesses the memory 112 via a data transfer path 400 passing through the PCIe switch 115, the NTB 214, the link 117, and the processor 111. The frontend interface 123 accesses the memory 122 via a data transfer path 401 passing through the PCIe switch 125, the NTB 234, the link 127, and the processor 121. Between the memories 112 and 122, the processors 111 and 121 transfer data via a data transfer path 402 passing through the link 140.

The frontend interface 113 sends an interrupt to the processor 111 via the PCIe switch 115, the NTB 214, and the link 117. The frontend interface 123 sends an interrupt to the processor 121 via the PCIe switch 125, the NTB 234, and the link 127.

Figure 5:
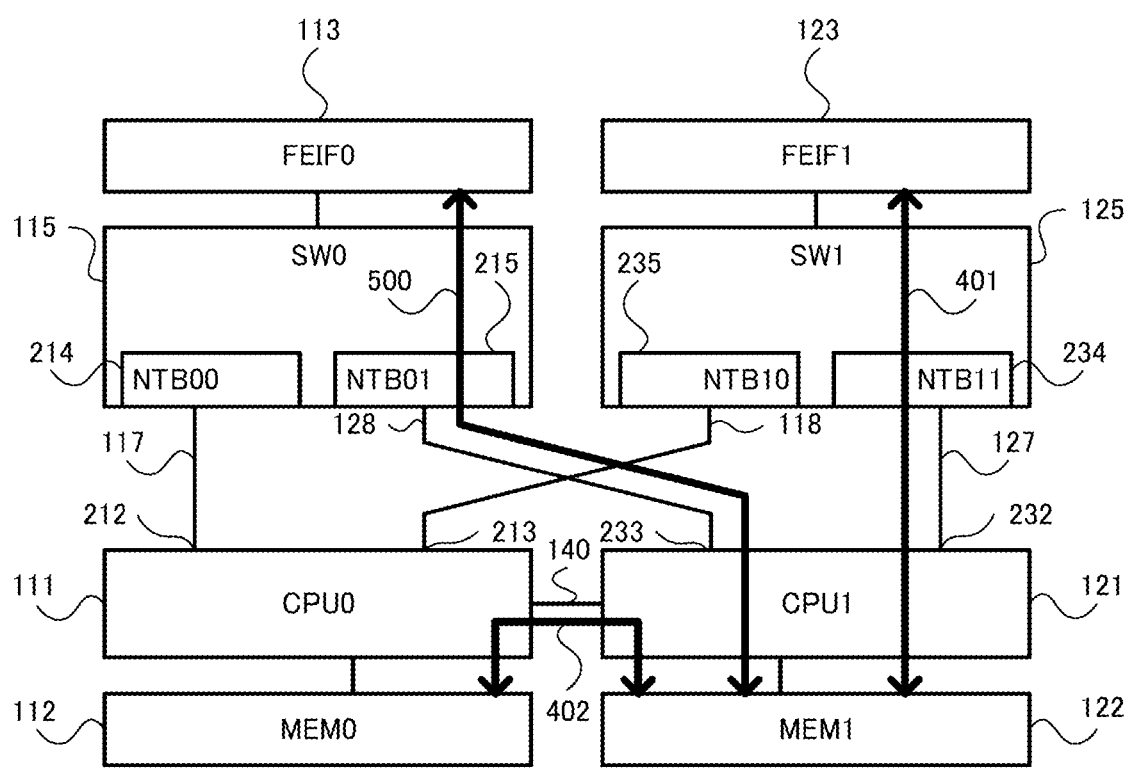
FIG. 5 is a diagram illustrating a data transfer path after a switch in an enqueueing destination queue of the frontend interface in the storage apparatus according to Example 1.

FIG. 5 is a diagram illustrating a data transfer path after a switch in an enqueueing destination queue of the frontend interface in the storage apparatus 100 according to Example 1.

Here, it is assumed that the frontend interface 113 and the processor 121 use the OQ 223 and the IQ 224 of FIG. 2 and the frontend interface 123 and the processor 121 use the OQ 221 and the IQ 222 of FIG. 2.

The frontend interface 113 accesses the memory 122 via a data transfer path 500 passing through the PCIe switch 115, the NTB 215, the link 128, and the processor 121. The frontend interface 123 accesses the memory 122 via a data transfer path 401 passing through the PCIe switch 125, the NTB 234, the link 127, and the processor 121. Between the memories 112 and 122, the processors 111 and 121 transfer data via the data transfer path 402 passing through the link 140.

The frontend interface 113 sends an interrupt to the processor 121 via the PCIe switch 115, the NTB 215, and the link 128. The frontend interface 123 sends an interrupt to the processor 121 via the PCIe switch 125, the NTB 234, and the link 127.

Figure 6:
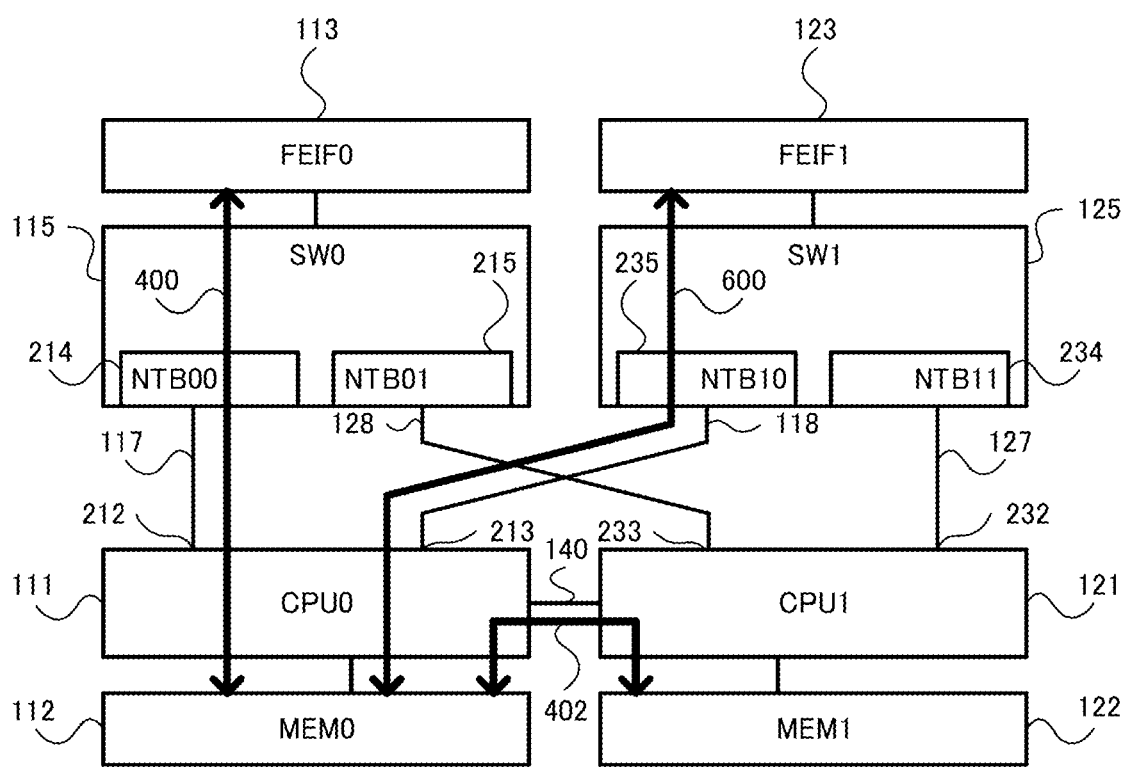
FIG. 6 is a diagram illustrating a data transfer path after a switch in an enqueueing destination queue of the frontend interface in the storage apparatus according to Example 1.

FIG. 6 is a diagram illustrating a data transfer path after a switch in an enqueueing destination queue of the frontend interface in the storage apparatus 100 according to Example 1.

Here, it is assumed that the frontend interface 113 and the processor 111 use the OQ 201 and the IQ 202 of FIG. 2 and the frontend interface 123 and the processor 111 use the OQ 203 and the IQ 204 of FIG. 2.

The frontend interface 113 accesses the memory 112 via a data transfer path 400 passing through the PCIe switch 115, the NTB 214, the link 117, and the processor 111. The frontend interface 123 accesses the memory 112 via a data transfer path 600 passing through the PCIe switch 125, the NTB 235, the link 118, and the processor 111. Between the memories 112 and 122, the processors 111 and 121 transfer data via the data transfer path 402 passing through the link 140.

The frontend interface 113 sends an interrupt to the processor 111 via the PCIe switch 115, the NTB 214, and the link 117. The frontend interface 123 sends an interrupt to the processor 111 via the PCIe switch 125, the NTB 235, and the link 118.

Figure 7:
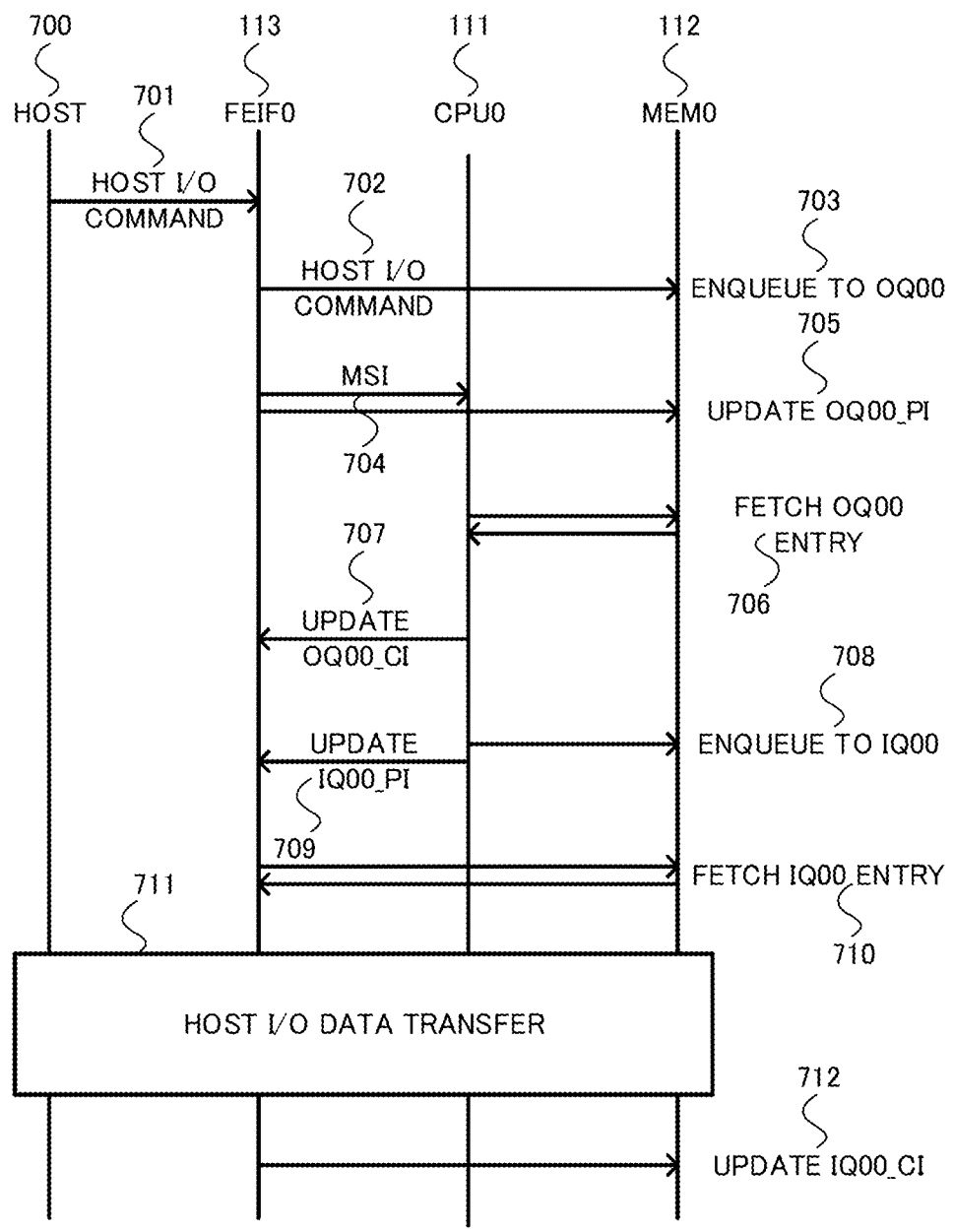
FIG. 7 is a diagram illustrating a data transfer sequence at a normal time in the storage apparatus according to Example 1.

FIG. 7 is a diagram illustrating a data transfer sequence at a normal time in the storage apparatus 100 according to Example 1.

Here, it is assumed that, for example, the frontend interface 113 and the processor 111 use the OQ 201 and the IQ 202.

First, a host apparatus 700 sends a host I/O command 701 to the frontend interface 113.

The frontend interface 113 receiving the host I/O command 701 enqueues an entry 702 including the command content in the OQ 201 (step 703).

Subsequently, the frontend interface 113 sends an interrupt to an address set in the interrupt setting register 217 to notify the processor 111 that the entry is enqueued in the OQ (step 704). Further, the frontend interface 113 updates OQ_PI of the OQ 201 which is in the memory 112 (step 705).

The processor 111 receiving the interrupt reads an entry in which content of the host I/O command is stored from the OQ 201 (step 706). Further, the processor 111 updates OQ_CI of the OQ 201 which is in the frontend interface 113 (step 707).

Subsequently, the processor 111 enqueues an entry including a data transfer list corresponding to the host I/O command 701 in the IQ 202 (step 708). Further, the processor 111 updates IQ_PI of the IQ 202 which is in the frontend interface 113 (step 709).

The frontend interface 113 in which IQ_PI is updated reads the entry including the data transfer list from the IQ 202 (step 710).

Subsequently, between the host apparatus 700 and the memory the frontend interface 113 executes data transfer in accordance with the data transfer list included in the entry read from the IQ 202 (step 711).

When the data transfer is completed, the frontend interface 113 updates IQ_CI of the IQ 202 which is in the memory 112 (step 712).

In this way, the processor 111 can process the host I/O command 701 received by the frontend interface 113.

Figure 8:
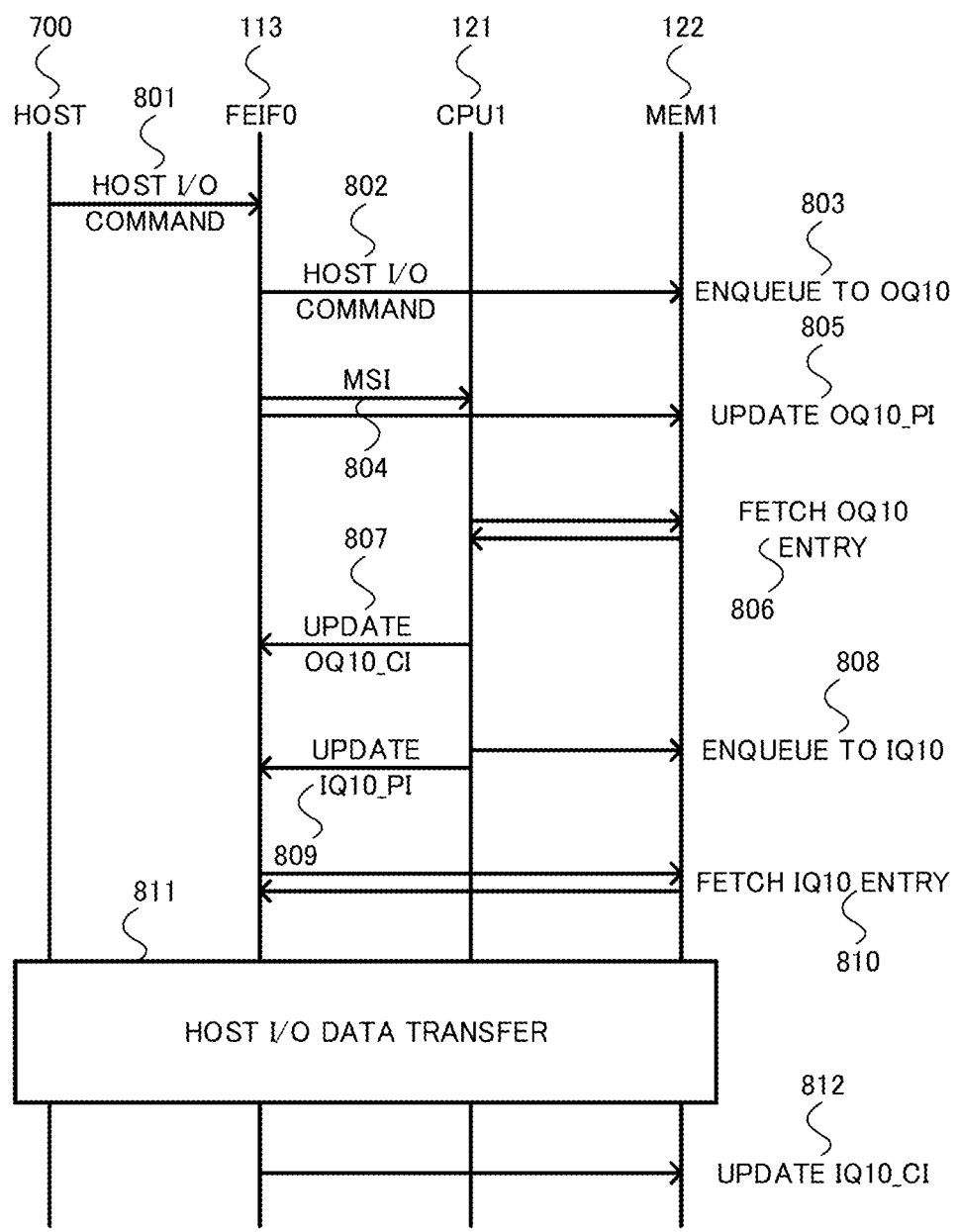
FIG. 8 is a diagram illustrating a data transfer sequence after a switch in an enqueueing destination queue of the frontend interface in the storage apparatus according to Example 1.

FIG. 8 is a diagram illustrating a data transfer sequence after a switch in an enqueueing destination queue of the frontend interface in the storage apparatus 100 according to Example 1.

Here, it is assumed that, for example, the frontend interface 113 and the processor 121 use OQ 223 and IQ 224.

First, the host apparatus 700 sends a host I/O command 801 to the frontend interface 113.

The frontend interface 113 receiving the host I/O command 801 enqueues an entry 802 including the command content in the OQ 223 (step 803).

Subsequently, the frontend interface 113 sends an interrupt to an address set in the interrupt setting register 218 to notify the processor 121 that the entry is enqueued in the OQ (step 804). Further, the frontend interface 113 updates OQ_PI of the OQ 223 which is in the memory 112 (step 805).

The processor 121 receiving the interrupt reads an entry in which content of the host I/O command is stored from the OQ 223 (step 806). Further, the processor 121 updates OQ_CI of the OQ 223 which is in the frontend interface 113 (step 807).

Subsequently, the processor 121 enqueues an entry including a data transfer list corresponding to the host I/O command 801 in the IQ 224 (step 808). Further, the processor 121 updates IQ_PI of the IQ 224 which is in the frontend interface 113 (step 809).

The frontend interface 113 in which IQ_PI is updated reads the entry including the data transfer list from the IQ 224 (step 810).

Subsequently, between the host apparatus 700 and the memory 122, the frontend interface 113 executes data transfer in accordance with the data transfer list included in the entry read from the IQ 224 (step 811).

When the data transfer is completed, the frontend interface 113 updates IQ_CI of the IQ 224 which is in the memory 122 (step 812).

In this way, the processor 121 can process the host I/O command 801 received by the frontend interface 113.

Figure 9:
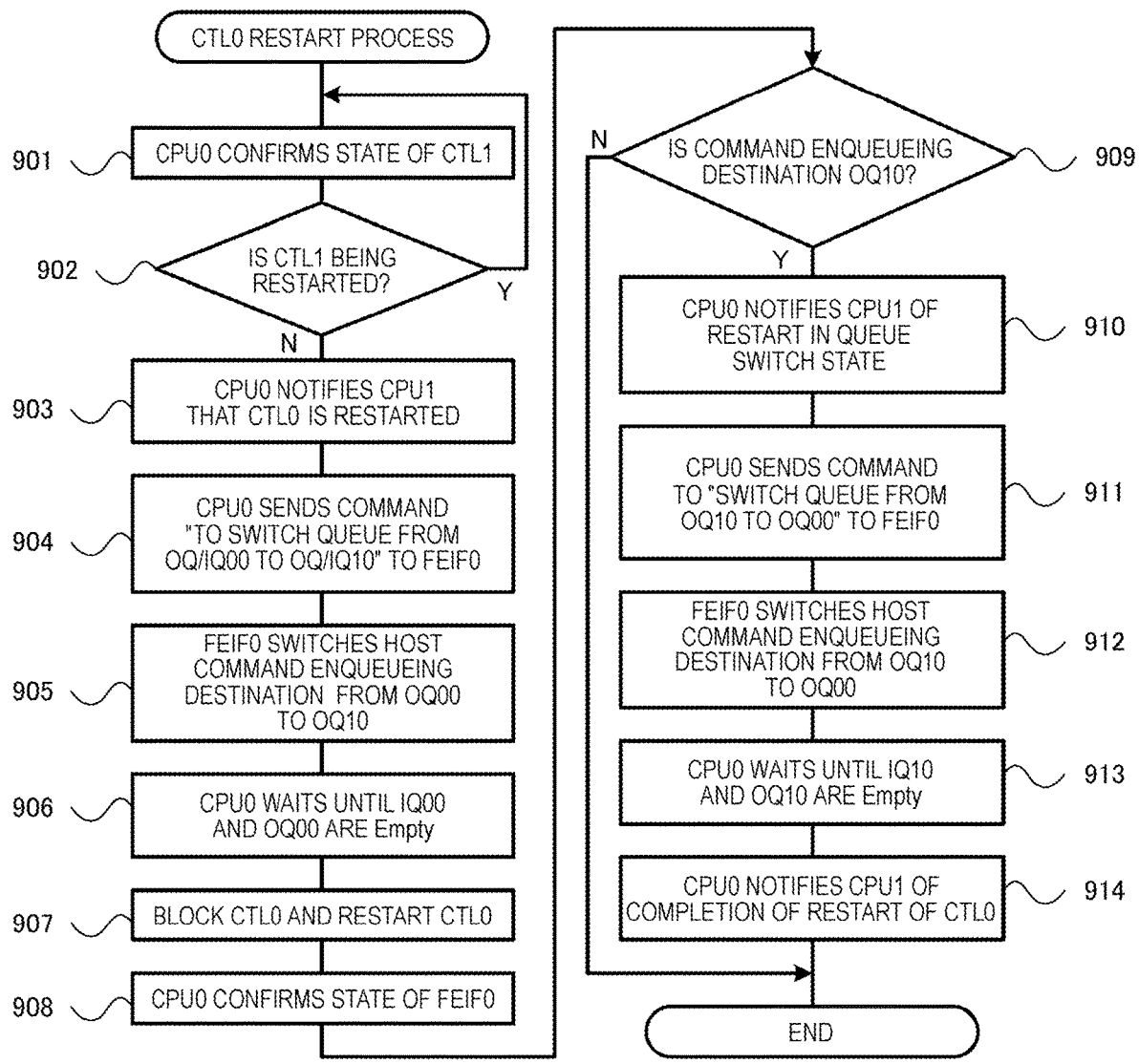
FIG. 9 is a flowchart illustrating a case where one-side controller restarts in the storage apparatus according to Example 1.

FIG. 9 is a flowchart illustrating a case where one-side controller restarts in the storage apparatus 100 according to Example 1.

Here, for example, a processing flow of a case where the processor 121 of the controller 120 takes over a process of a host I/O received by the frontend interface 113 when the controller 110 restarts will be described.

First, the processor 111 confirms whether the controller 120 is restarting (step 901).

Subsequently, in step 902, the process returns to step 901 when the controller 120 is restarting. When the controller 120 is not restarting, the process proceeds to step 903.

Subsequently, the processor 111 notifies the processor 121 that a restart process of the controller 110 is started (step 903).

Subsequently, the processor 111 sends a queue switch command to switch an operation target queue from the OQ 201 and the IQ 202 to the OQ 223 and the IQ 224 to the frontend interface 113 (step 904).

The frontend interface 113 receiving the queue switch command enqueues a subsequently received host I/O command in the OQ 223 (step 905). In other words, the frontend interface 113 switches the OQ of an enqueueing destination from a newly received exchange. It can be determined whether the exchange is newly started by investigating an exchange ID included in the host I/O command.

That is, the frontend interface 113 enqueues a host I/O command in which the exchange ID is first switched (that is, a first host I/O command to which a new exchange ID is given) and a subsequent host I/O command among the host I/O command received from the host apparatus 700 after the reception of the queue switch command from the processor 111 in the OQ 223.

Subsequently, the processor 111 waits until the OQ 201 and the IQ 202 are empty (step 906). When OQ_PI and OQ_CI of the OQ 201 are the same, the processor 111 can determine whether the OQ 201 is empty. Similarly, when IQ_PI and IQ_CI of the IQ 202 are the same, the processor 111 can determine whether the IQ 202 is empty. When the OQ 201 and the IQ 202 are empty, it can be understood that there is no host I/O which is a host I/O received by the frontend interface 113 and is an uncompleted host I/O to be processed by the processor 111 in association with the OQ 201.

Further, to guarantee that there is no uncompleted host I/O associated with the OQ 201, the processor 111 may investigate an entry corresponding to the host I/O command processed recently with the OQ 201 and an entry corresponding to a response processed recently with the IQ 202 to determine whether the exchange IDs included in the entries match each other. When the OQ 201 and the IQ 202 are empty and the exchange IDs of the OQ 201 and the IQ 202 match each other, it can be understood that there is no host I/O which is a host I/O received by the frontend interface 113 and is an uncompleted host I/O to be processed by the processor 111.

Subsequently, the storage apparatus 100 blocks the controller 110 and executes a process necessary for update or the like of the OS. Then, the storage apparatus 100 continues to operate with only the one-side controller 120. Thereafter, the storage apparatus 100 restarts the controller 110. Thus, the processor 111 stops and restarts (step 907).

After the controller 110 restarts, the processor 111 confirms a queue switch setting situation of the frontend interface 113 (step 908).

Subsequently, when a host I/O command enqueueing destination is the OQ 223 in step 909, the process proceeds to step 910. Otherwise, the process ends.

Subsequently, the processor 111 notifies the processor 121 of the restart of the controller 110 in a state in which the operation target queue of the frontend interface 113 is switched (step 910).

Subsequently, the processor 111 sends a queue switch command to switch the operation target queues from the OQ 223 and IQ 224 to the OQ 201 and the IQ 202 to the frontend interface 113 (step 911).

The frontend interface 113 receiving the queue switch command enqueues the host I/O command received with a subsequently new exchange ID in the OQ 201 (step 912).

Subsequently, the processor 111 waits until the OQ 223 and the IQ 224 are empty (step 913). When OQ_PI and OQ_CI of the OQ 223 are the same, the processor 111 can determine that the OQ 223 is empty. Similarly, when IQ_PI and IQ_CI of the IQ 224 are the same, the processor 111 can determine that the IQ 224 is empty. The fact that the OQ 223 and the IQ 224 are empty means that there is no uncompleted host I/O which is received by the frontend interface 113 and is to be processed by the processor 121.

Further, to guarantee that there is no uncompleted host I/O associated with the OQ 223, the processor 111 may investigate an entry corresponding to the host I/O command processed recently with the OQ 223 and an entry corresponding to a response processed recently with the IQ 224 to determine whether the exchange IDs included in the entries match each other.

Finally, the processor 111 notifies the processor 121 of the restart process completion of the controller 110 (step 914).

As described above, the storage apparatus 100 according to Example 1 restarts the controller after completion of the switch process of the enqueueing destination OQ by the frontend interface and completion of the host I/O during the process before the switch. Thus, even when the one-side controller restarts, the host I/O is not paused.

In the storage apparatus 100 according to Example 1, the example in which a pair of OQ and IQ are disposed in each frontend interface for each controller has been described. However, in the storage apparatus 100, two or more pairs of OQs and IQs may be disposed. For example, when two pairs of OQs and IQs are disposed in each frontend interface for each controller, the two pairs are set as units of switch processes.

For example, it may be assumed that a failure occurs in the processor 111, the memory 112, or the like of the controller 110. Even in this case, an influence of the failure is not sent to the frontend interface 113 and the controller 120 by the NTBs 211, 214, and 215. Here, even when a failure occurs in the processor 111, the processor 111 cannot send a queue switch command to the frontend interface 113. In this case, with a heartbeat or the like via the link 140, the processor 121 detecting that a failure occurs in the processor 111 sends an instruction to switch an enqueueing destination of the host I/O command to the side of the normal controller 120 to the frontend interface 113 via the link 128, the NTB 215, and the PCIe switch 115. Accordingly, the storage apparatus 100 according to Example 1 can continue operating. Here, in this case, it is necessary for the host apparatus to resend the uncompleted I/O which is being processed in the controller 110 in which the failure occurs.

Example 2

Next, a storage apparatus according to Example 2 will be described with reference to FIGS. 10 and 11. A configuration of the storage apparatus according to Example 2 is similar to that of the storage apparatus according to Example 1, as illustrated in FIGS. 1 to 9, except for differences to be described below. Therefore, the explanation is omitted.

The storage apparatus 100 according to Example 2 controls data transfer between the frontend interface 113 and the processors 111 and 121 by using both a pair of the OQ 201 and the IQ 202 and a pair of OQ 223 and IQ 224 at a normal time. In this case, any of the processors 111 and 121 receives a host I/O command received by the frontend interface 113 via the OQ 201 or the OQ 223. In response to an instruction from the processor 111, it can be switched whether the pair of OQ 201 and IQ 202 are used or the pair of OQ 223 and IQ 224 are used for data transfer.

Similarly, the storage apparatus 100 according to Example 2 controls data transfer between the frontend interface 123 and the processors 111 and 121 by using both a pair of the OQ 221 and the IQ 222 and a pair of OQ 203 and IQ 204 at a normal time. In this case, any of the processors 111 and 121 receives a host I/O command received by the frontend interface 123 via the OQ 221 or the OQ 203. In response to an instruction from the processor 121, it can be switched whether the pair of OQ 221 and IQ 222 are used or the pair of OQ 203 and IQ 204 are used for data transfer.

Such a switch process in the storage apparatus according to Example 2 is referred to as a "switching queue" process.

Figure 10:
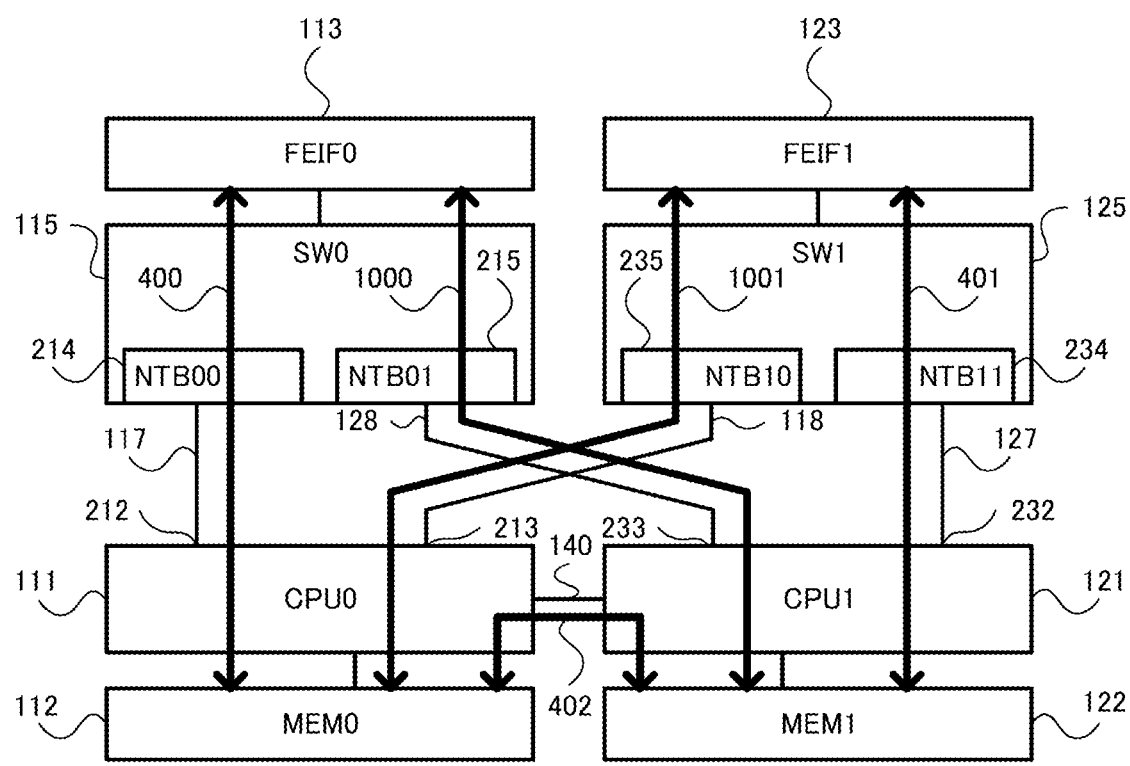
FIG. 10 is a diagram illustrating a data transfer path at a normal time between a frontend interface and a memory in a storage apparatus according to Example 2.

FIG. 10 is a diagram illustrating a data transfer path at a normal time between a frontend interface and a memory in the storage apparatus according to Example 2.

Here, it is assumed that the frontend interface 113 and the processor 111 use the OQ 201 and the IQ 202 of FIG. 2 and the frontend interface 113 and the processor 121 use the OQ 223 and the IQ 224 of FIG. 2.

It is also assumed that the frontend interface 123 and the processor 121 use the OQ 221 and the IQ 222 of FIG. 2 and the frontend interface 123 and the processor 111 use the OQ 203 and the IQ 204 of FIG. 2.

The frontend interface 113 accesses the memory 112 via the data transfer path 400 passing through the PCIe switch 115, the NTB 214, the link 117, and the processor 111. The frontend interface 113 accesses the memory 122 via a data transfer path 1000 passing through the PCIe switch 115, the NTB 215, the link 128, and the processor 121.

The frontend interface 123 accesses the memory 122 via the data transfer path 401 passing through the PCIe switch 125, the NTB 234, the link 127, and the processor 121. The frontend interface 123 accesses the memory 112 via a data transfer path 1001 passing through the PCIe switch 125, the NTB 235, the link 118, and the processor 111.

Between the memories 112 and 122, the processors 111 and 121 transfer data via the data transfer path 402 passing through the link 140.

The frontend interface 113 sends an interrupt to the processor 111 via the PCIe switch 115, the NTB 214, and the link 117. The frontend interface 113 sends an interrupt to the processor 121 via the PCIe switch 115, the NTB 215, and the link 128. The frontend interface 123 sends an interrupt to the processor 111 via the PCIe switch 125, the NTB 235, and the link 118. The frontend interface 123 sends an interrupt to the processor 121 via the PCIe switch 125, the NTB 234, and the link 127.

Figure 11:
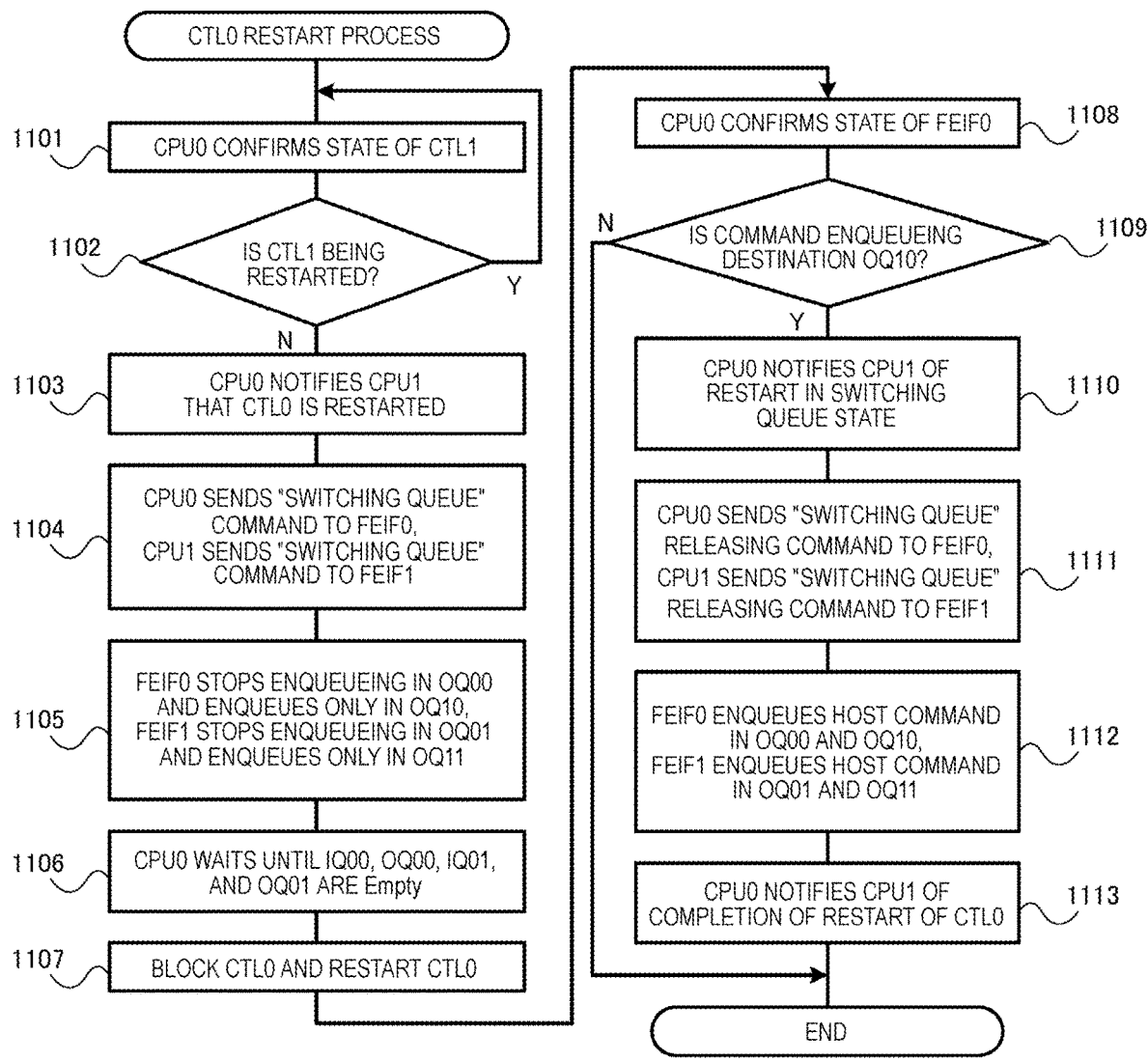
FIG. 11 is a flowchart illustrating a case where one-side controller restarts in the storage apparatus according to Example 2.

FIG. 11 is a flowchart illustrating a case where one-side controller restarts in the storage apparatus according to Example 2.

Here, for example, a processing flow of a case where the processor 121 of the controller 120 takes over a process of a host I/O received by the frontend interface 113 when the controller 110 restarts will be described.

First, the processor 111 confirms whether the controller 120 is restarting (step 1101).

Subsequently, in step 1102, the process returns to step 1101 when the controller 120 is restarting. When the controller 120 is not restarting, the process proceeds to step 1103.

Subsequently, the processor 111 notifies the processor 121 that a restart process of the controller 110 is started (step 1103).

Subsequently, the processor 111 sends a switching queue command to switch an operation target queue to only the OQ 223 and the IQ 224 to the frontend interface 113. The processor 121 sends a switching queue command to switch an operation target queue only to the OQ 221 and the IQ 223 to the frontend interface 123 (step 1104).

The frontend interface 113 receiving the switching queue command enqueues a host I/O command received with a new exchange ID subsequently in only the OQ 223. The frontend interface 123 receiving the switching queue command enqueues a host I/O command received with a new exchange ID subsequently in only the OQ 221 (step 1105).

Subsequently, the processor 111 waits until the OQ 201, the IQ 202, the OQ 203, and the IQ 204 are empty (step 1106). When OQ_PI and OQ_CI of the OQ 201 are the same, the processor 111 can determine that the OQ 201 is empty. Similarly, when IQ_PI and IQ_CI of the IQ 202 are the same, the processor 111 can determine that the IQ 202 is empty. When the OQ 201 and the IQ 202 are empty, it can be understood that there is no host I/O which is a host I/O received by the frontend interface 113 and is an uncompleted host I/O to be processed by the processor 111 in association with the OQ 201.

Further, to guarantee that there is no uncompleted host I/O associated with the OQ 201, the processor 111 may investigate an entry corresponding to the host I/O command processed recently with the OQ 201 and an entry corresponding to a response processed recently with the IQ 202 to determine whether the exchange IDs included in the entries match each other. When the OQ 201 and the IQ 202 are empty and the exchange IDs of the OQ 201 and the IQ 202 match each other, it can be understood that there is no host I/O which is a host I/O received by the frontend interface 113 and is an uncompleted host I/O to be processed by the processor 111 in association with the OQ 201 and the IQ 202.

When OQ_PI and OQ_CI of the OQ 203 are equal, the processor 111 can determine that the OQ 203 is empty. Similarly, when OQ_PI and OQ_CI of the IQ 204 are equal, the processor 111 can determine that the IQ 204 is empty. When the OQ 203 and the IQ 204 are empty, it can be understood that there is no host I/O which is a host I/O received by the frontend interface 123 and is an uncompleted host I/O to be processed by the processor 111 in association with the OQ 203.

Further, to guarantee that there is no uncompleted host I/O associated with the OQ 203, the processor 111 may investigate an entry corresponding to the host I/O command processed recently with the OQ 203 and an entry corresponding to a response processed recently with the IQ 204 to determine whether the exchange IDs included in the entries match each other. When the OQ 203 and the IQ 204 are empty and the exchange IDs of the OQ 203 and the IQ 204 match each other, it can be understood that there is no host I/O which is a host I/O received by the frontend interface 123 and is an uncompleted host I/O to be processed by the processor 111 in association with the OQ 203 and IQ 204.

Subsequently, the storage apparatus 100 according to Example 2 blocks the controller 110 and executes a process necessary for update or the like of the OS. Then, in the storage apparatus 100 according to Example 2, only the one-side controller 120 continues to operate. With the blockage process, the processor 111 stops. Thereafter, the storage apparatus 100 restarts the controller 110. Thus, the processor 111 stops and restarts (step 1107).

After the controller 110 restarts, the processor 111 confirms a switching queue setting situation of the frontend interface 113 (step 1108).

Subsequently, when a host I/O command enqueueing destination is only the OQ 223 in step 1109, the process proceeds to step 1110. Otherwise, the process ends.

Subsequently, the processor 111 notifies the processor 121 of the restart of the controller 110 in a state in which the operation target queue of the frontend interface 113 is switched (step 1110).

Subsequently, processor 111 sends a command to release the switching queue state to the frontend interface 113. The processor 121 sends a command to release the switching queue state to the frontend interface 123 (step 1111).

The frontend interface 113 receiving the switching queue releasing command enqueues the host I/O command received with a new exchange ID subsequently in the OQ 201 or the OQ 223. The frontend interface 123 receiving the switching queue releasing command enqueues the host I/O command received with a new exchange ID subsequently in the OQ 221 or the OQ 203 (step 1112).

Finally, the processor 111 notifies the processor 121 of the restart process completion of the controller 110 (step 1113).

As described above, the storage apparatus 100 according to Example 2 restarts the controller after completion of the switching queue process of the enqueueing destination OQ by the frontend interface and completion of the host I/O during the process before the switch in the enqueueing destination OQ by the switching queue process. Thus, even when the controller restarts, the host I/O is not paused.

In the storage apparatus 100 according to Example 2, the example in which a pair of OQ and IQ are disposed in each frontend interface for each controller has been described. However, in the storage apparatus 100, two or more pairs of OQs and IQs may be disposed. For example, when two pairs of OQs and IQs are disposed in each frontend interface for each controller, the two pairs are set as units of switching queue processes.

Example 3

Next, a storage apparatus according to Example 3 will be described with reference to FIGS. 12 to 15. A configuration of the storage apparatus according to Example 3 is similar to that of the storage apparatus according to Example 1, as illustrated in FIGS. 1 to 9, except for differences to be described below.

Figure 12:
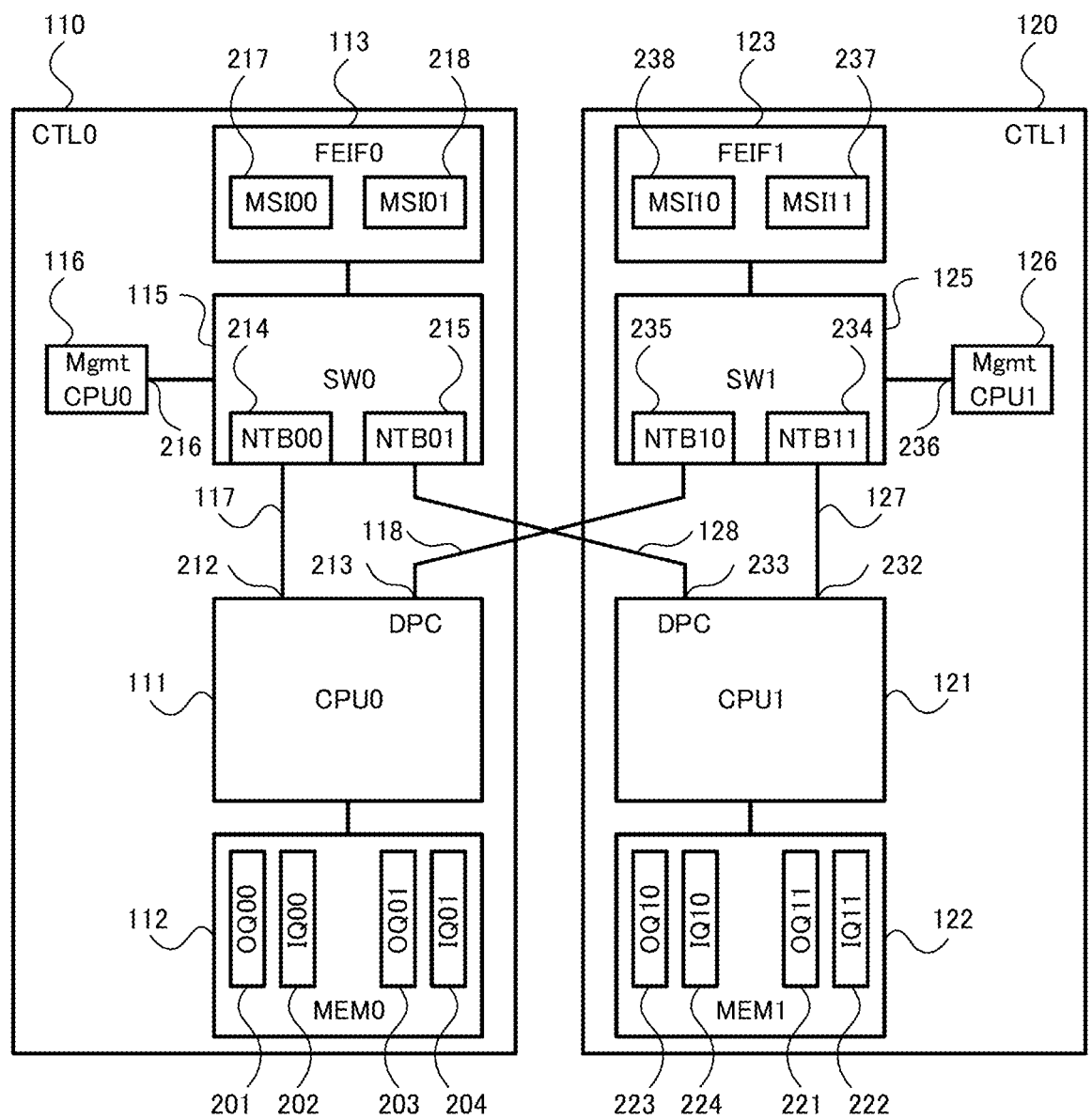
FIG. 12 is a diagram illustrating a configuration of controllers in a storage apparatus according to Example 3.

FIG. 12 is a diagram illustrating a configuration of controllers in the storage apparatus according to Example 3.

In FIG. 12, to facilitate description, the backend interfaces are omitted as in FIG. 2. The storage apparatus according to Example 3 does not have a link (the link 140 in FIG. 2) linking the processors and corresponding to the link 140 in FIG. 2. Instead, the processors 111 and 121 execute data transfer between the processors along a path passing through links 118 and 128 and the PCIe switches 115 and 125.

Figure 13:
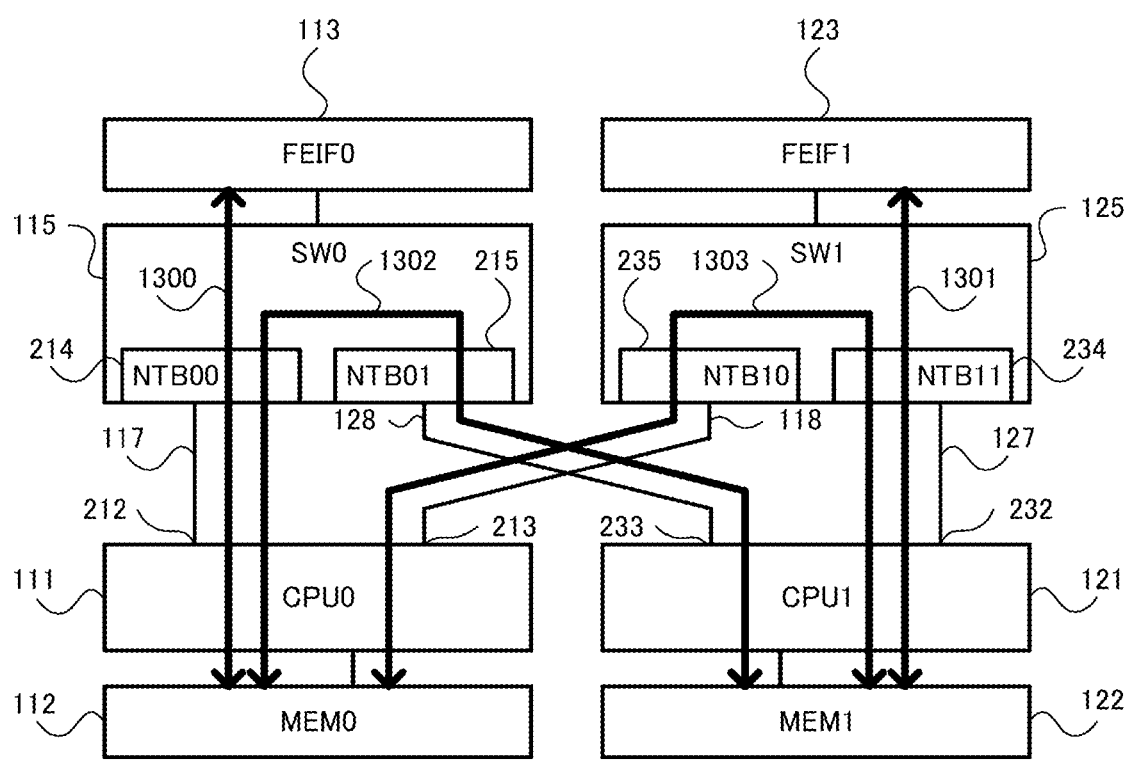
FIG. 13 is a diagram illustrating a data transfer path at a normal time between frontend interfaces and memories in the storage apparatus according to Example 3.

FIG. 13 is a diagram illustrating a data transfer path at a normal time between frontend interfaces and memories in the storage apparatus according to Example 3.

At the normal time, the frontend interface 113 and the processor 111 use the OQ 201 and the IQ 202 of FIG. 12 and the frontend interface 113 and the processor 121 use the OQ 223 and the IQ 224 of FIG. 12 to control data transfer.

The frontend interface 113 accesses the memory 112 via a data transfer path 1300 passing through the PCIe switch 115, the NTB 214, the link 117, and the processor 111. The frontend interface 123 accesses the memory 122 via a data transfer path 1301 passing through the PCIe switch 125, the NTB 234, the link 127, and the processor 121. Between the memories 112 and 122, the processors 111 and 121 transfer data via a data transfer path 1302 passing through the processor 111, the link 117, the NTB 214, the PCIe switch 115, the NTB 215, the link 128, and the processor 121. Between the memories 112 and 122, the processors 111 and 121 transfer data via a data transfer path 1303 passing through the processor 121, the link 127, the NTB 234, the PCIe switch 125, the NTB 235, the link 118, and the processor 111. As a use method for two data transfer paths 1302 and 1303 between the processors, it is conceivable that one of the data transfer paths is used for user data transfer in which a transfer data amount is large and the other of the data transfer paths is used for control data transfer in which a transfer data amount of the storage apparatus is small. Accordingly, it is possible to expect the effect of shortening a control data transfer time.

The frontend interface 113 sends an interrupt to the processor 111 via the PCIe switch 115, the NTB 214, and the link 117. The frontend interface 123 sends an interrupt to the processor 121 via the PCIe switch 125, the NTB 234, and the link 127.

Figure 14:
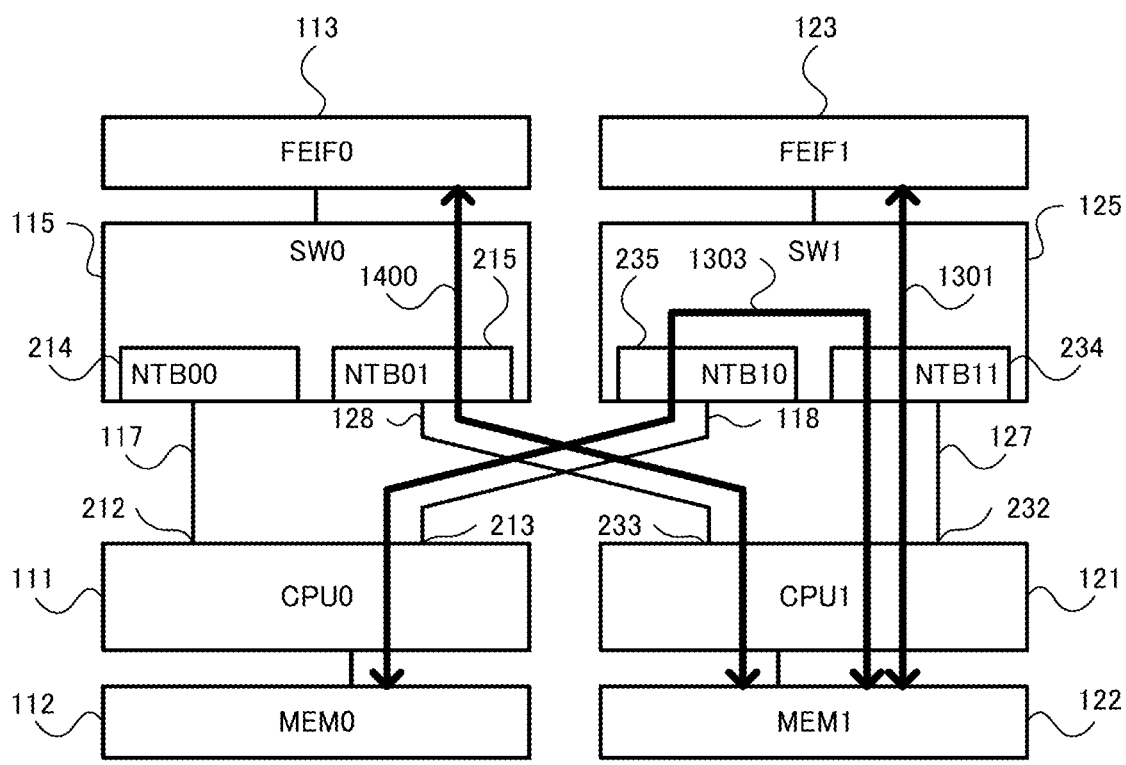
FIG. 14 is a diagram illustrating a data transfer path after a switch in an enqueueing destination queue of the frontend interface in the storage apparatus according to Example 3.

FIG. 14 is a diagram illustrating a data transfer path after a switch in an enqueueing destination queue of the frontend interface in the storage apparatus according to Example 3.

Here, it is assumed that the frontend interface 113 and the processor 121 use the OQ 223 and the IQ 224 of FIG. 12 and the frontend interface 123 and the processor 121 use the OQ 221 and the IQ 222 of FIG. 12.

The frontend interface 113 accesses the memory 122 via a data transfer path 1400 passing through the PCIe switch 115, the NTB 215, the link 128, and the processor 121. The frontend interface 123 accesses the memory 122 via a data transfer path 1301 passing through the PCIe switch 125, the NTB 234, the link 127, and the processor 121. Between the memories 112 and 122, the processors 111 and 121 transfer data via the data transfer path 1303 passing through the processor 121, the link 127, the NTB 234, the PCIe switch 125, the NTB 235, the link 118, and the processor 111. Between the memories 112 and 122, the processors 111 and 121 transfer data via the data transfer path 1302 (FIG. 13) passing through the processor 111, the link 117, the NTB 214, the PCIe switch 115, the NTB 215, the link 128, and the processor 121.

The frontend interface 113 sends an interrupt to the processor 121 via the PCIe switch 115, the NTB 215, and the link 128. The frontend interface 123 sends an interrupt to the processor 121 via the PCIe switch 125, the NTB 234, and the link 127.

Figure 15:
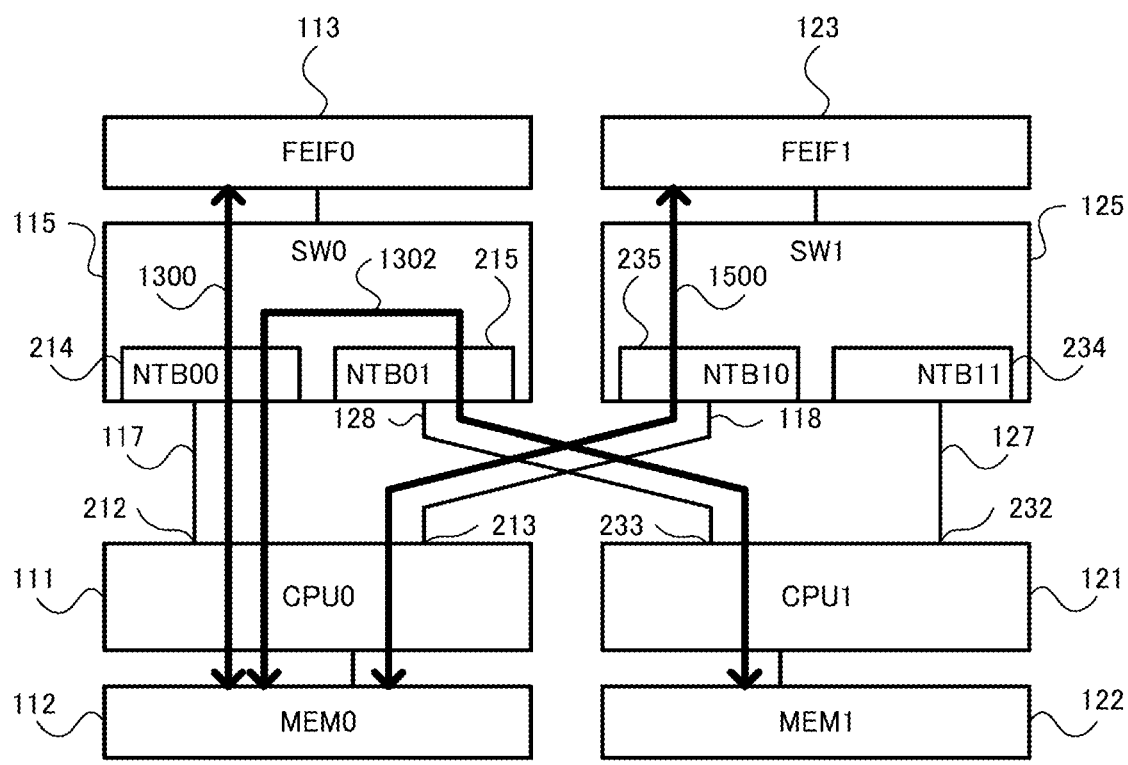
FIG. 15 is a diagram illustrating a data transfer path after a switch in the enqueueing destination queue of the frontend interface in the storage apparatus according to Example 3.

FIG. 15 is a diagram illustrating a data transfer path after a switch in the enqueueing destination queue of the frontend interface in the storage apparatus according to Example 3.

Here, it is assumed that the frontend interface 113 and the processor 111 use the OQ 201 and the IQ 202 of FIG. 12 and the frontend interface 123 and the processor 111 use the OQ 203 and the IQ 204 of FIG. 12.

The frontend interface 113 accesses the memory 112 via the data transfer path 1300 passing through the PCIe switch 115, the NTB 214, the link 117, and the processor 111. The frontend interface 123 accesses the memory 112 via a data transfer path 1500 passing through the PCIe switch 125, the NTB 235, the link 118, and the processor 111. Between the memories 112 and 122, the processors 111 and 121 transfer data via the data transfer path 1302 passing through the processor 111, the link 117, the NTB 214, the PCIe switch 115, the NTB 215, the link 128, and the processor 121. Between the memories 112 and 122, the processors 111 and 121 transfer data via the data transfer path 1303 (FIG. 13) passing through the processor 121, the link 127, the NTB 234, the PCIe switch 125, the NTB 235, the link 118, and the processor 111.

The frontend interface 113 sends an interrupt to the processor 111 via the PCIe switch 115, the NTB 214, and the link 111. The frontend interface 123 sends an interrupt to the processor 111 via the PCIe switch 125, the NTB 235, and the link 118.

As in the storage apparatus 100 according to Example 1, the storage apparatus 100 according to Example 3 restarts the controller after completion of the switch process of the enqueueing destination OQ by the frontend interface and completion of the host I/O during the process before the switch. Thus, even when the one-side controller restarts, the host I/O is not paused. In the storage apparatus 100 according to Example 3, the number of links connected between the controllers is smaller than in the storage apparatus 100 according to Example 1. Therefore, mounting is easy.

The system according to an embodiment of the present invention may be configured as follows.

(1) A storage apparatus (for example, the storage apparatus 100) that processes a request from a host apparatus includes a plurality of storage controllers. A first storage controller (for example, the controller 110) in the plurality of storage controllers includes a first frontend interface (for example, the frontend interface 113) that controls a protocol of communication with the host apparatus, and a first processor (for example, the that controls the storage apparatus. A processor 111) second storage controller (for example, the controller 120) in the plurality of storage controllers includes a second processor (for example, the processor 121) that controls the storage apparatus. The first storage controller further includes a first address translation unit (for example, the NTB 214) that executes translation between a first address used by the first processor and a second address used by the first frontend interface, a second address translation unit (for example, the NTB 215) that executes translation between a third address used by the second processor and the second address used by the first frontend interface, a first outbound queue (for example, the OQ 201) that controls data transfer from the first frontend interface to the first processor through the first address translation unit, and a first inbound queue (for example, the IQ 202) that controls data transfer from the first processor to the first frontend interface through the first address translation unit. The second storage controller further includes a second outbound queue (for example, the OQ 223) that controls data transfer from the first frontend interface to the second processor through the second address translation unit, and a second inbound queue (for example, the IQ 224) that controls data transfer from the second processor to the first frontend interface through the second address translation unit. The first frontend interface receives a first enqueueing destination switch instruction to designate the second outbound queue as an enqueueing destination of a request from the host apparatus and then switches an enqueueing destination to the second outbound queue from a request which comes from the host apparatus and to which an identifier (for example, an exchange ID) of a series of operations related to a subsequently received new host request is given (for example, steps 904 and 905 or steps 1104 and 1105).

Accordingly, even when the processor of one-side controller of dual controllers stops the process, the processor of the other controller can take over an I/O request from the host apparatus and continuously respond to the I/O request.

(2) In the above (1), the first processor sends the first enqueueing destination switch instruction to the first frontend interface before a process is stopped (for example, step 904 or step 1104) and, stops the process after the first outbound queue and the first inbound queue are empty (for example, steps 906 and 907 or steps 1106 and 1107).

Accordingly, for example, in order to update an OS, when the processor of one-side controller is planned to stop, the processor of the other controller can take over the I/O request from the host apparatus and continuously respond to the I/O request.

(3) In the above (2), the first processor stops the process when an identifier of a series of operations related to a request which comes from the host apparatus and which is recently processed with the first outbound queue and an identifier of a series of operations related to a host request to a response recently processed with the first inbound queue among responses to requests from the host apparatus indicate the same host request (for example, steps 906 and 907 and steps 1106 and 1107).

Accordingly, it is possible to reliably determine that there is no uncompleted host I/O and stop the processor at an appropriate timing.

(4) In the above (1), the first frontend interface individually sets a transfer destination address of a first interrupt related to the first outbound queue and a transfer destination address of a second interrupt related to the second outbound queue, sends the first interrupt to the first processor through the first address translation unit (for example, via the data transfer path 400), and sends the second interrupt to the second processor through the second address translation unit (for example, via the data transfer path 500).

Accordingly, when the processor of one-side controller stops the process, the processor of the other-side controller can take over the I/O request from the host apparatus.

(5) In the above (1), the first processor is able to read an enqueueing destination setting of the first frontend interface.

Accordingly, it is possible to confirm a current enqueueing destination.

(6) In the above (1), the first processor switches an enqueueing destination to the first outbound queue when the enqueueing destination is the second outbound queue as a result obtained by reading the enqueueing destination setting of a request from the host apparatus from the first frontend interface after restart (for example, Yes in step 909 to step 912 or Yes in step 1109 to step 1112).

Accordingly, it is possible to resume the I/O by the restarted processor.

(7) In the above (1), the first storage controller further includes a third address translation unit (for example, the NTB 235) that executes translation between the first address used by the first processor and a fourth address used by a second frontend interface, and a fourth address translation unit (for example, the NTB 234) that executes translation between the third address used by the second processor and the fourth address used by the second frontend interface. The first and second processors communicate with each other through the third and fourth address translation units (for example, via the data transfer path 1303).

Accordingly, it is possible to reduce the number of links connected between the controllers, and thus mounting is easy.

(8) In the above (1), a switch (for example, the switch 115) including the first and second address translation units is included. The first and second processors communicate with each other through the switch (for example, via the data transfer path 1302).

Accordingly, it is possible to reduce the number of links connected between the controllers, and thus mounting is easy.

(9) In the above (1), the first frontend interface enqueues a request from the host apparatus to the first or second outbound queue before the first enqueueing destination switch instruction is received (for example, sends via the data transfer path 400 or 1000). The first processor sends the first enqueueing destination switch instruction to the first frontend interface before the process is stopped (for example, step 1104). When the first enqueueing destination switch instruction is received from the first processor, the first frontend interface enqueues requests in only the second outbound queue from a request from the host apparatus to which an identifier of a series of operations related to a subsequently received new host request is given (for example, step 1105). The first processor stops the process after the first outbound queue and the first inbound queue are empty (for example, steps 1106 and 1107).

Accordingly, when one frontend interface enqueues at a normal time in regard to queues related to the plurality of processors, switching queues process with respect to queues related to the other-side processor is processed before one-side processor stops. Therefore, even when the processor of the one-side controller stops the process, the processor of the other-side controller can take over the I/Q request from the host apparatus and continuously responds to the I/O request.

(10) In the above (9), the second storage controller further includes a second frontend interface (for example, the frontend interface 123) that controls a protocol of communication with the host apparatus, a third address translation unit (for example, the NTB 235) that executes translation between the first address used by the first processor and a fourth address used by the second frontend interface, a fourth address translation unit (for example, the NTB 234) that executes translation between the third address used by the second processor and a fourth address used by the second frontend interface, a third outbound queue (for example, the OQ 221) that controls data transfer from the second frontend interface to the second processor through the fourth address translation unit, and a third inbound queue (for example, the IQ 222) that executes data transfer from the second processor to the second frontend interface through the fourth address translation unit. The first storage controller further includes a fourth outbound queue (for example, the OQ 203) that controls data transfer from the second frontend interface to the first processor through the third address translation unit, and a fourth inbound queue (for example, the IQ 204) that controls data transfer from the first processor to the second frontend interface through the third address translation unit. The second frontend interface enqueues a request from the host apparatus in the third or fourth outbound queue. The second processor sends a second enqueueing destination switch instruction to designate the third outbound queue as an enqueueing destination of a request from the host apparatus to the second frontend interface before the first processor stops the process (for example, step 1104). When the second enqueueing destination switch instruction is received, the second frontend interface enqueues requests in only the third outbound queue from a request from the host apparatus to which an identifier of a series of operations related to a subsequently received new host request is given (for example, step 1105). The first processor stops the process after the first outbound queue, the first inbound queue, the fourth outbound queue, and the fourth inbound queue are empty (for example, steps 1106 and 1107).

Accordingly, when one frontend interface enqueues at a normal time in regard to queues related to the plurality of processors, switching queues process with respect to queues related to the other-side processor is processed before one-side processor stops. Therefore, even when the processor of the one-side controller stops the process, the processor of the other-side controller can take over the I/Q request from the host apparatus and continuously respond to the I/O request.

(11) In the above (10), an identifier of a series of operations related to a request which comes from the host apparatus and which is recently processed with the first outbound queue and an identifier of a series of operations related to a host request to a response recently processed with the first inbound queue among responses to requests from the host apparatus indicate the same host request. The first processor stops the process when an identifier of a series of operations related to a request which comes from the host apparatus and which is recently processed with the fourth outbound queue and an identifier of a series of operations related to a host request to a response recently processed with the fourth inbound queue among responses to requests from the host apparatus indicate the same host request (for example, steps 1106 and 1107).

Accordingly, it is possible to reliably determine that there is no uncompleted host I/O and stop the processor at an appropriate timing.

(12) In the above (1), when a failure occurs in the first storage controller, the second processor detecting the failure sends the first enqueueing destination switch instruction to the first frontend interface.

Accordingly, even when a failure occurs in the processor of the one-side controller, the processor of the other-side controller can take over the I/Q request from the host apparatus and continuously respond to the I/O request.

The present invention is not limited to the foregoing examples and includes various modifications. For example, the foregoing examples have been described in detail to further understand the present invention and all the described configurations are not necessarily included. Some of the configurations according to a certain example can be replaced with the configurations according to another example, and the configurations according to another example can be added to the configurations according to a certain example. Other configurations can be added to, deleted from, or replaced with some of the configurations according to each example.

Some or all of the foregoing configurations, functions, processing units, processing mechanism, and the like may be implemented with hardware by designing, for example, integrated circuits. The foregoing configurations, functions, and the like may be implemented with software by causing processors to interpret and execute programs implementing the functions. Information regarding a program, a table, a file, or the like implementing each function can be stored in a storage apparatus such as a nonvolatile semiconductor memory, a hard disk drive, a solid state drive (SSD) or a computer-readable non-transitory data storage medium such as an IC card, an SD card, or a DVD.

Control lines and information lines indicate lines considered to be required for description, and cannot be said to be all control lines and information lines on products. Actually, it may be considered that almost all the configurations are connected to each other.

What is claimed is:

1. A storage apparatus that processes a request from a host apparatus, the storage apparatus comprising a plurality of storage controllers,
    wherein a first storage controller in the plurality of storage controllers includes
        a first frontend interface that controls a protocol of communication with the host apparatus, and
        a first processor that controls the storage apparatus,
    wherein a second storage controller in the plurality of storage controllers includes a second processor that controls the storage apparatus,
    wherein the first storage controller further includes
        a first address translation unit that executes translation between a first address used by the first processor and a second address used by the first frontend interface,
        a second address translation unit that executes translation between a third address used by the second processor and the second address used by the first frontend interface,
        a first outbound queue that controls data transfer from the first frontend interface to the first processor through the first address translation unit, and
        a first inbound queue that controls data transfer from the first processor to the first frontend interface through the first address translation unit,
    wherein the second storage controller further includes
        a second outbound queue that controls data transfer from the first frontend interface to the second processor through the second address translation unit, and
        a second inbound queue that controls data transfer from the second processor to the first frontend interface through the second address translation unit, and
    wherein the first frontend interface receives a first enqueueing destination switch instruction to designate the second outbound queue as an enqueueing destination of a request from the host apparatus and then switches an enqueueing destination to the second outbound queue from a request which comes from the host apparatus and to which an identifier of a series of operations related to a subsequently received new host request is given.

2. The storage apparatus according to claim 1, wherein the first processor
    sends the first enqueueing destination switch instruction to the first frontend interface before a process is stopped, and
    stops the process after the first outbound queue and the first inbound queue are empty.

3. The storage apparatus according to claim 2, wherein the first processor stops the process when an identifier of a series of operations related to a request which comes from the host apparatus and which is recently processed with the first outbound queue and an identifier of a series of operations related to a host request to a response recently processed with the first inbound queue among responses to requests from the host apparatus indicate the same host request.

4. The storage apparatus according to claim 1, wherein the first frontend interface
    individually sets a transfer destination address of a first interrupt related to the first outbound queue and a transfer destination address of a second interrupt related to the second outbound queue,
    sends the first interrupt to the first processor through the first address translation unit, and
    sends the second interrupt to the second processor through the second address translation unit.

5. The storage apparatus according to claim 1, wherein the first processor is able to read an enqueueing destination setting of the first frontend interface.

6. The storage apparatus according to claim 5, wherein the first processor switches an enqueueing destination to the first outbound queue when the enqueueing destination is the second outbound queue result obtained by reading the enqueueing destination setting of a request from the host apparatus from the first frontend interface after restart.

7. The storage apparatus according to claim 1, further comprising:
    a third address translation unit that executes translation between the first address used by the first processor and a fourth address used by a second frontend interface; and a fourth address translation unit that executes translation between the third address used by the second processor and a fourth address used by the second frontend interface, wherein the first and second processors communicate with each other through the third and fourth address translation units.

8. The storage apparatus according to claim 1, wherein a switch including the first and second address translation units is included, and wherein the first and second processors communicate with each other through the switch.

9. The storage apparatus according to claim 1, wherein the first frontend interface enqueues a request from the host apparatus to the first or second outbound queue before the first enqueueing destination switch instruction is received, wherein the first processor sends the first enqueueing destination switch instruction to the first frontend interface before the process is stopped, wherein, when the first enqueueing destination switch instruction is received from the first processor, the first frontend interface enqueues requests in only the second outbound queue from a request from the host apparatus to which an identifier of a series of operations related to a subsequently received new host request is given, and wherein the first processor stops the process after the first outbound queue and the first inbound queue are empty.

10. The storage apparatus according to claim 9, wherein the second storage controller further includes
a second frontend interface that controls a protocol of communication with the host apparatus,
a third address translation unit that executes translation between the first address used by the first processor and a fourth address used by the second frontend interface,
a fourth address translation unit that executes translation between the third address used by the second processor and a fourth address used by the second frontend interface,
a third outbound queue that controls data transfer from the second frontend interface to the second processor through the fourth address translation unit, and
a third inbound queue that executes data transfer from the second processor to the second frontend interface through the fourth address translation unit, wherein the first storage controller further includes
a fourth outbound queue that controls data transfer from the second frontend interface to the first processor through the third address translation unit, and
a fourth inbound queue that controls data transfer from the first processor to the second frontend interface through the third address translation unit, wherein the second frontend interface enqueues a request from the host apparatus in the third or fourth outbound queue, wherein the second processor sends a second enqueueing destination switch instruction to designate the third outbound queue as an enqueueing destination of a request from the host apparatus to the second frontend interface before the first processor stops the process, wherein, when the second enqueueing destination switch instruction is received, the second frontend interface enqueues requests in only the third outbound queue from a request from the host apparatus to which an identifier of a series of operations related to a subsequently received new host request is given, and wherein the first processor stops the process after the first outbound queue, the first inbound queue, the fourth outbound queue, and the fourth inbound queue are empty.

11. The storage apparatus according to claim 10, wherein an identifier of a series of operations related to a request which comes from the host apparatus and which is recently processed with the first outbound queue and an identifier of a series of operations related to a host request to a response recently processed with the first inbound queue among responses to requests from the host apparatus indicate the same host request, and wherein the first processor stops the process when an identifier of a series of operations related to a request which comes from the host apparatus and which is recently processed with the fourth outbound queue and an identifier of a series of operations related to a host request to a response recently processed with the fourth inbound queue among responses to requests from the host apparatus indicate the same host request.

12. The storage apparatus according to claim 1, wherein, when a failure occurs in the first storage controller, the second processor detecting the failure sends the first enqueueing destination switch instruction to the first frontend interface.

13. A method of controlling storage controllers of a storage apparatus that processes a request from a host apparatus, wherein the storage apparatus includes a plurality of storage controllers, wherein a first storage controller in the plurality of storage controllers includes
a first frontend interface that controls a protocol of communication with the host apparatus, and
a first processor that controls the storage apparatus, wherein a second storage controller in the plurality of storage controllers includes a second processor that controls the storage apparatus, wherein the first storage controller further includes
a first address translation unit that executes translation between a first address used by the first processor and a second address used by the first frontend interface,
a second address translation unit that executes translation between a third address used by the second processor and the second address used by the first frontend interface,
a first outbound queue that controls data transfer from the first frontend interface to the first processor through the first address translation unit, and
a first inbound queue that controls data transfer from the first processor to the first frontend interface through the first address translation unit, wherein the second storage controller further includes
a second outbound queue that controls data transfer from the first frontend interface to the second processor through the second address translation unit, and
a second inbound queue that controls data transfer from the second processor to the first frontend interface through the second address translation unit, and wherein the method comprises:
receiving, by the first frontend interface, a first enqueueing destination switch instruction to designate the second outbound queue as an enqueueing destination of a request from the host apparatus; and switching, by the first frontend interface, an enqueueing destination to the second outbound queue from a request which comes from the host apparatus and to which an identifier of a series of operations related to a subsequently received new host request is given after receiving the first enqueueing destination switch instruction.

* * * * *